US 12,208,780 B2

(12) United States Patent
Gaughan et al.

(10) Patent No.: US 12,208,780 B2
(45) Date of Patent: Jan. 28, 2025

(54) AUTOMATIC SET AND RELEASE RETAINER VALVE ASSEMBLY OF AN AIR BRAKE SYSTEM

(71) Applicant: Westinghouse Air Brake Technologies Corporation, Pittsburgh, PA (US)

(72) Inventors: Edward Gaughan, Wilmerding, PA (US); William Potter, Wilmerding, PA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 500 days.

(21) Appl. No.: 17/506,894

(22) Filed: Oct. 21, 2021

(65) Prior Publication Data
US 2022/0176933 A1 Jun. 9, 2022

Related U.S. Application Data

(60) Provisional application No. 63/122,302, filed on Dec. 7, 2020.

(51) Int. Cl.
| | |
|---|---|
| *B60T 17/22* | (2006.01) |
| *B60T 13/68* | (2006.01) |
| *B60T 15/02* | (2006.01) |

(52) U.S. Cl.
CPC .......... *B60T 17/221* (2013.01); *B60T 13/683* (2013.01); *B60T 15/021* (2013.01); *B60T 15/027* (2013.01)

(58) Field of Classification Search
CPC .... B60T 17/221; B60T 17/228; B60T 13/683; B60T 13/665; B60T 15/021; B60T 15/027
See application file for complete search history.

(56) References Cited

U.S. PATENT DOCUMENTS

| | | | |
|---|---|---|---|
| 2002/0038976 A1 | 4/2002 | Hart et al. | |
| 2002/0180264 A1* | 12/2002 | Moffitt | B60T 13/665 |
| | | | 303/128 |
| 2003/0057765 A1 | 3/2003 | Mortenson et al. | |
| 2016/0023645 A1* | 1/2016 | Wright | B60T 15/184 |
| | | | 303/66 |

(Continued)

FOREIGN PATENT DOCUMENTS

CN 102325677 A * 1/2012 ............ B60T 13/683

OTHER PUBLICATIONS

D. Sammon and B. Sheesley, "Air Brake Retaining Valves—A History and Use in the Modern Railroad Environment," Air Brake Association, 5 pages, date unknown.

(Continued)

*Primary Examiner* — Thomas J Williams
(74) *Attorney, Agent, or Firm* — K&L Gates LLP

(57) ABSTRACT

A set and release retainer valve assembly of an air brake system engages and releases an air brake while retaining a designated pressure within a brake cylinder. The pressure is retained within the brake cylinder to generate a higher brake cylinder pressure on a subsequent brake application and/or prevent movement of the vehicle system after release of the air brake system. The air brake is subsequently re-engaged to re-set the retaining valve assembly and exhaust the designated air pressure out of the brake cylinder, where the air brake of the vehicle system is released to permit the movement of the vehicle system after re-setting the retaining valve assembly.

19 Claims, 23 Drawing Sheets

(56) References Cited

U.S. PATENT DOCUMENTS

| | | |
|---|---|---|
| 2017/0080913 A1 | 3/2017 | Goujon et al. |
| 2018/0208172 A1 | 7/2018 | Potter et al. |
| 2018/0208220 A1 | 7/2018 | Wright et al. |
| 2018/0236987 A1 | 8/2018 | Wright |
| 2018/0257626 A1 | 9/2018 | Gaughan et al. |
| 2018/0339691 A1 | 11/2018 | Kepley |
| 2019/0344764 A1 | 11/2019 | Kernwein et al. |
| 2022/0176933 A1* | 6/2022 | Gaughan ............... B60T 13/683 |

OTHER PUBLICATIONS

Examination Report No. 1 for corresponding patent application No. 2021261925 (7 pages).

\* cited by examiner

AUTOMATIC SET AND RELEASE RETAINER VALVE ASSEMBLY OF AN AIR BRAKE SYSTEM

CROSS-REFERENCE TO RELATED APPLICATIONS

This application claims priority to U.S. Provisional Application No. 63/122,302 (filed 7 Dec. 2020), the entire disclosure of which is incorporated herein by reference.

BACKGROUND

Technical Field

The subject matter described herein relates to air brake systems.

Discussion of Art

Some vehicle systems have air brake systems that engage and release brakes based on changes in air pressure within different components of the air brake systems. When a brake pipe extending along the length of a vehicle system and associated reservoirs onboard vehicles of the vehicle system are pressurized with air, the air brakes in the vehicle systems are released. To engage the brakes, the pressure in the brake pipe is reduced. This causes a service portion of each of the vehicles to direct air from the reservoir of that vehicle to a brake cylinder of that vehicle to engage the brake. To release the brakes, a compressor adds air pressure to the brake pipe and reservoirs, and the air pressure within the brake cylinders is then released. This causes the brakes to release with enough air pressure in the brake pipe and reservoirs to subsequently disengage the brakes.

Some vehicle systems may include retaining valves that are manually actuated to retain at least some air pressure within the brake cylinders following engagement of the brakes. These retaining valves may be actuated to close and prevent all of the air pressure in the brake cylinders from exhausting to the ambient environment during recharging of the air pressure in the brake pipe and reservoirs (e.g., by the compressor). This can assist in preventing movement of the vehicle systems following an emergency brake application, as this type of brake application (a) may involve a significantly greater pressure drop in the brake pipe and reservoirs than a normal brake application and (b) may require a longer time period to recharge the air pressure in the brake pipe and reservoirs before movement may commence (to ensure that there is sufficient air pressure to stop movement if needed). Actuating the retaining valves can ensure that enough air pressure is withheld in the air brake system to prevent full release of the brakes while the brake pipe and reservoir are recharged with air.

But, these manually controlled retainer valves must subsequently be manually actuated again (e.g., to a release or vent position or state) to allow the retained air pressure in the brake cylinders to vent through exhausts of the brake system. Otherwise, the air pressure retained in the brake cylinders by the retainer valves remains in the brake cylinders. As a result, the brakes may remain engaged after the vehicle system begins movement again. This can result in wheels locking up and being damaged by the route (e.g., by forming flat spots on the wheels and/or overheating the wheels due to the wheels sliding, and not rolling, along the route).

Manually setting and re-setting the retainer valves can take a significant amount of time for vehicle systems that can be very long, such as freight trains. Additionally, with increasing numbers of retainer valves in these longer vehicle systems, the likelihood that one or more of the retainer valves is accidentally left in a state or mode where air pressure is retained in the brake cylinder can increase.

Thus, a need exists for assemblies and methods that can automatically control retainer valves of a brake system.

BRIEF DESCRIPTION

In one embodiment, a method includes engaging an air brake onboard a vehicle system and subsequently releasing the air brake while retaining a designated air pressure within a brake cylinder of the air brake using a retaining valve assembly. The designated air pressure is retained within the brake cylinder to one or more of generate a higher brake cylinder pressure on at least one subsequent brake application and/or prevent movement of the vehicle system after release of the air brake system. The designated air pressure is retained within the brake cylinder to generate a higher brake cylinder pressure on at least one subsequent brake application (relative to the brake cylinder pressure on a subsequent brake application without the presence of the designated air pressure) and/or prevent movement of the vehicle system after release of the air brake system. The method also includes subsequently re-engaging the air brake to re-set the retaining valve assembly and exhaust the designated air pressure out of the brake cylinder, where the air brake of the vehicle system is released to permit the movement of the vehicle system after re-setting the retaining valve assembly.

In one embodiment, a retainer valve assembly includes a retainer check valve that may be fluidly coupled with a brake cylinder of an air brake. The retainer check valve may retain air pressure at a designated air pressure within the brake cylinder. The retainer check valve also may vent at least part of the air pressure that is retained in the brake cylinder. The assembly also includes a lock-up piston assembly fluidly coupled with the retainer check valve and the brake cylinder between the retainer check valve and the brake cylinder. In a release state of the air brake, the lock-up piston assembly may direct the at least part of the air pressure that is vented from the brake cylinder to a system exhaust. Responsive to an engagement of the air brake and subsequent release of the air brake, the lock-up piston assembly may receive the at least part of the air pressure that is vented from the brake cylinder and direct the at least part of the air pressure that is vented from the brake cylinder to the retainer check valve to retain additional air pressure within the brake cylinder. Responsive to a subsequent re-engagement of the air brake, the lock-up piston assembly may vent the additional air pressure from the brake cylinder to the system exhaust.

In one embodiment, a method includes fluidly coupling a retainer check valve with a brake cylinder of an air brake. The retainer check valve may retain a designated air pressure within the brake cylinder. The method also includes fluidly coupling a lock-up piston assembly with the retainer check valve and the brake cylinder between the retainer check valve and the brake cylinder. In a release state of the air brake, the lock-up piston assembly may direct air pressure that is vented from the brake cylinder to a system exhaust. Responsive to an engagement of the air brake and subsequent release of the air brake, the lock-up piston assembly may receive the air pressure that is vented from the brake cylinder and direct the air pressure vented from the brake cylinder to the retainer check valve to retain the designated air pressure within the brake cylinder. Responsive to a subsequent re-engagement of the air brake, the lock-up piston assembly may vent the designated air pressure to the system exhaust.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the inventive subject matter described herein may relate to retainer valve assemblies, brake systems, and methods that can control actuation of retainer valves to dictate when air pressure is retained or vented from brake cylinders in an air brake system. While one or more embodiments of the inventive subject matter are described in connection with rail vehicle systems, not all embodiments are limited in this way. One or more embodiments of the retainer valve assemblies, brake systems, and/or methods can be used with other vehicles, such as trucks, buses, agricultural vehicles, or the like, that use air brakes.

In one embodiment, once a brake application occurs, air pressure exhaust from a brake cylinder is retained at a designated pressure following actuation of a retainer valve assembly. For example, following an engagement of air brakes, retainer valve assemblies can be set to a retain or high pressure state or mode, where a designated amount of air pressure is kept within the brake cylinders and not permitted to leave the brake cylinders via or through the retainer valve assemblies when the brake application is released and the brake system is recharging. This designated amount of air pressure can be twenty pounds per square inch (e.g., one hundred thirty-eight kilopascals), or another value. The retainer valve assemblies can be actuated to the retain or high pressure state from a single manual actuation of all retainer valve assemblies (or a selected set of two or more retainer valve assemblies) and/or from an automatic actuation of all (or the selected set) of the retainer valve assemblies following venting of a brake pipe of the air brake system.

Exhaust of pressure in the brake cylinders may be directed to retaining check valves in the retainer valve assemblies upon release of the brake application. These retaining check valves maintain the designated air pressure within the brake cylinders. The air pressure within the brake pipes and reservoirs can be increased by one or more compressors. A subsequent brake application resets the retainer valve assemblies to connect the exhausts of the brake cylinders to exhaust of the air brake systems. For example, the subsequent application of the air brake system can reset the retainer valve assemblies to no longer retain the designated air pressure in the brake cylinders. Instead, this previously retained air pressure may be vented out of the brake cylinders to the ambient environment upon the release of the application. This can ensure that the retainer valve assemblies are reset without requiring manual resetting of each individual retainer valve assembly (e.g., by an operator walking the length of the vehicle system to reset each retainer valve assembly).

Figure 1:
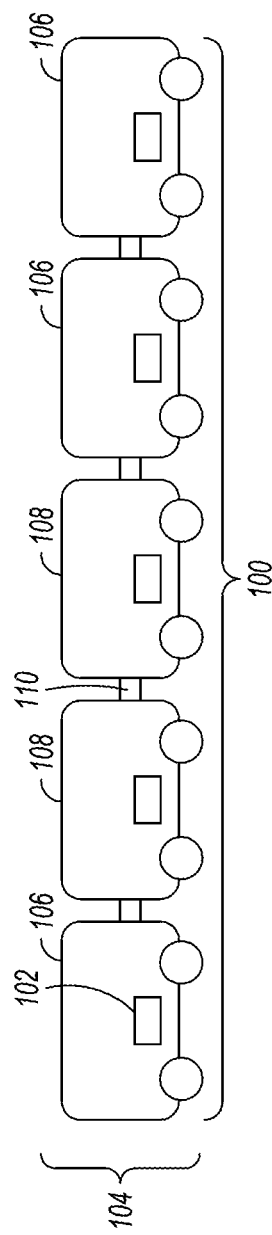
FIG. 1 illustrates one example of an air brake system having one or more retainer valve assemblies.

FIG. 1 illustrates one example of a brake system 100 having one or more retainer valve assemblies 102. In this embodiment, the brake system is an air brake system. The air brake system may be disposed onboard a vehicle system 104 formed from one or more vehicles 106, 108. While the vehicle system is shown as formed from multiple vehicles, the vehicle system may be formed from fewer or less vehicles, or may be formed from only a single vehicle. The vehicles 106 can represent propulsion-generating vehicles (e.g., locomotives, trucks, etc.) and the vehicles 108 can represent non-propulsion-generating vehicles (e.g., rail cars, trailers, etc.). The air brake system can include a brake pipe 110 that fluidly couples air brakes disposed onboard the different vehicles. In one embodiment, the vehicles may be grouped to together. The grouping may be mechanical, virtual/logical/communicative, or both.

Figure 2:
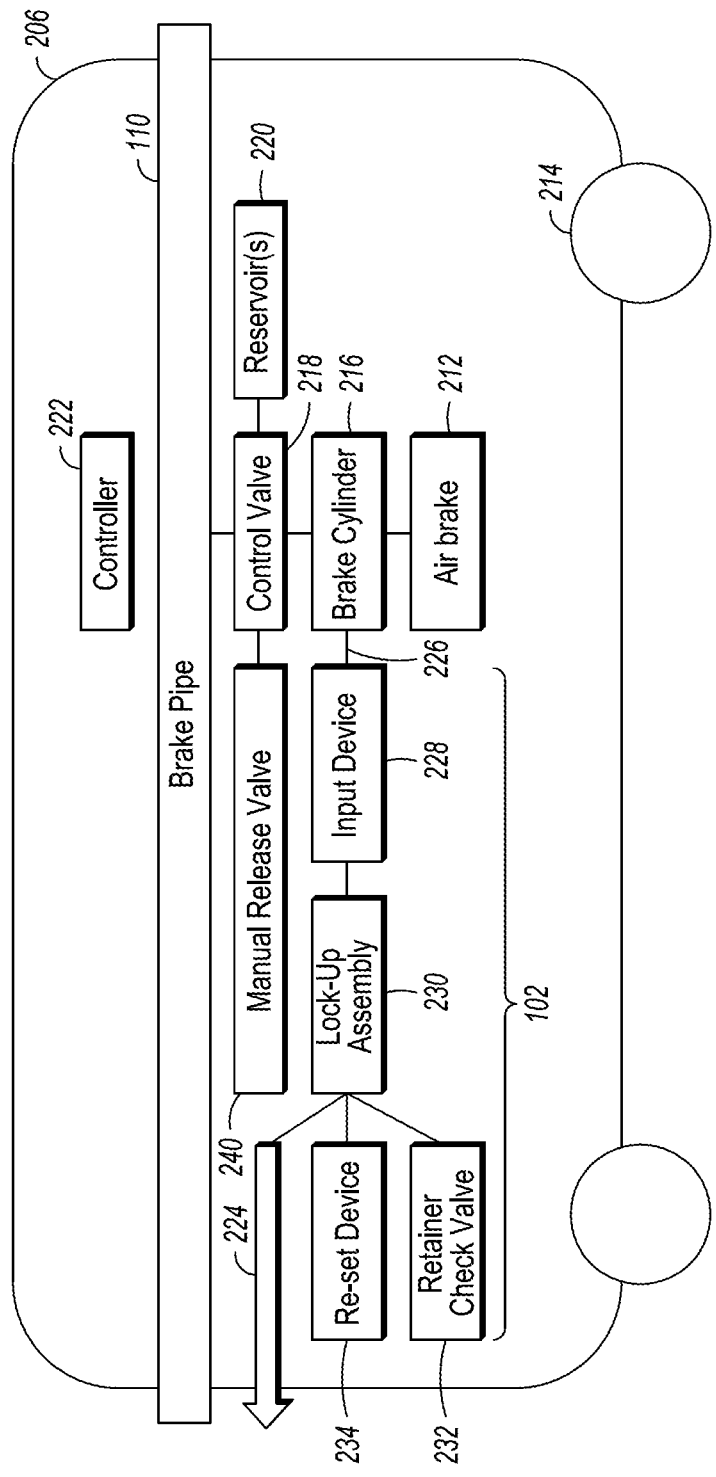
FIG. 2 illustrates one example of a vehicle that can represent one of the vehicles shown in FIG. 1.

With continued reference to the brake system shown in FIG. 1, FIG. 2 illustrates one example of a vehicle 206 that can represent one of the vehicles shown in FIG. 1. With respect to a multi-vehicle system, portions of the air brake system may be disposed onboard different vehicles. With respect to a single vehicle system the air brake system may be disposed onboard a single vehicle. The air brake system includes the brake pipe that supplies air pressure to air brakes 212 onboard the different vehicles of the vehicle system. The air brake shown in FIG. 2 can represent a friction body, such as a brake shoe, that may move toward a wheel 214 of the vehicle responsive to increasing pressure in a brake cylinder 216 of the brake system. The brake cylinder may be fluidly coupled with a control valve 218 that directs the flow of air pressure between and/or among the brake pipe, the brake cylinder, one or more reservoirs 220, and/or the retainer valve assembly. The control valve can be a three-way valve or a system of several valves that direct the flow of air pressure between and/or among these components. The reservoirs can represent an auxiliary reservoir and/or an emergency reservoir that can hold air pressure for regular service applications of the air brake and emergency applications of the air brake, respectively. There may be several air brakes onboard a single vehicle, with the air brakes engaging different wheels of the same vehicle. The components of the air brake system are shown in FIG. 2 as coupled by conduits 226, such as one or more pipes, hoses, manifolds, etc.

The retainer valve assembly includes an input device 228 that may be fluidly coupled with the brake cylinder by one or more of the conduits. As described below, the input device can be manually or pneumatically actuated to control whether exhaust from the brake cylinder may be directed to a lock-up assembly 230. The lock-up assembly can receive pressure from the input device to either direct the cylinder exhaust to a system exhaust 224, a retainer check valve 232, or a re-set device 234, as described below. The system exhaust can be a port or outlet that directs air pressure out of the brake system to the ambient environment surrounding the vehicle.

In operation of one embodiment of the air brake system and the retainer valve assemblies, the air brakes may be engaged via a service or emergency application of the air brakes to stop movement of the vehicle system. The air brakes may be manually or automatically engaged (or applied), such as by an operator providing input to apply the brakes via a controller 222 or by the controller automatically directing the brake application. The controller can represent hardware circuitry that includes and/or is connected with one or more processors (e.g., microprocessors, field programmable gate arrays, integrated circuits, etc.) that operate as described herein. The controller can send one or more signals to the control valve to direct the control valve to vent the brake pipe to apply the brakes, which causes air pressure in the reservoir(s) to flow to the brake cylinders to apply the air brakes.

Following the air brake application, the air brakes may be released. For example, the controller may be manually directed or may automatically send signal(s) to the control valve to increase brake pipe pressure and direct air pressure in the brake pipe (e.g., from one or more compressors) to the reservoir(s) to re-charge the air pressure in the reservoir(s). Subsequent to the air brakes being released, the retainer valve assembly can allow some, but not all, of the air pressure in the brake cylinders from the brake application to flow out of the air brake system and the vehicle system (e.g., via an exhaust vent or port of the system exhaust 224). For example, the retainer valve assembly may retain a designated amount of air pressure that may be greater than ambient air pressure outside of the vehicle system and/or an amount of air pressure necessary to keep the air brake engaged with the wheel following release and recharge of the brake system. In one embodiment, the retainer valve assembly may retain twenty pounds per square inch of air pressure within the brake cylinder. Alternatively, the retainer valve assembly may retain another amount of air pressure within the brake cylinder, such as ten pounds per square inch, thirty pounds per square inch, or the like.

The retainer valve assembly can retain this amount of air pressure automatically and without requiring manual actuation of the retainer valve assembly in one embodiment. As described below, the retainer valve assembly can be pneumatically controlled to retain the air pressure in the brake cylinder. Alternatively, the retainer valve assembly may be manually actuated to retain the air pressure in the brake cylinder. As another example, the retainer valve assembly may be automatically actuated by one or more motors under control of the controller to retain the air pressure in the brake cylinder.

The retainer valve assembly can hold back the designated amount of air pressure in the brake cylinder to prevent movement of the vehicle system while the air pressure in the brake pipe and/or reservoir(s) recharges (e.g., increases back up to associated thresholds). This can prevent the vehicle system from inadvertently moving while the air brake system may be recharging (e.g., when the vehicle system has stopped on a grade following an emergency brake application, where recharging of the air brake system may take a significant amount of time).

The retainer valve assembly can continue to retain at least the designated amount of air pressure within the brake cylinder until the retainer valve assembly is re-set by a subsequent brake application. For example, the retainer valve assembly can be re-set to allow the air pressure retained in the brake cylinder to vent out of the exhaust so that there may be not enough air pressure in the brake cylinder to engage the air brake against the wheel.

In one embodiment, the retainer valve assembly may be pneumatically re-set without requiring any operator intervention. For example, the retainer valve assemblies in the vehicle system may be re-set to allow the retained air pressure in the brake cylinders to vent via the exhaust of the air brake system without an operator having to walk or otherwise travel to each retainer valve assembly and manually actuate each retainer valve assembly. In another embodiment, the retainer valve assembly may be controlled by operation of an input device. The input device can represent one or more input devices capable of being manually actuated to re-set the retainer valve assembly, such as one or more push buttons, levers, or the like. In another embodiment, the reset devices can represent one or more motors that operate based on signals received from the controller to re-set the retainer valve assembly.

When the retainer valve assembly is re-set, the retainer valve assembly allows the air pressure previously retained within the brake cylinder to vent out of the exhaust of the air brake system. This allows the vehicle system to resume movement without the air brakes engaged on the wheels, thereby avoiding the wheels being locked up by air pressure retained within the brake cylinders.

Figure 3:
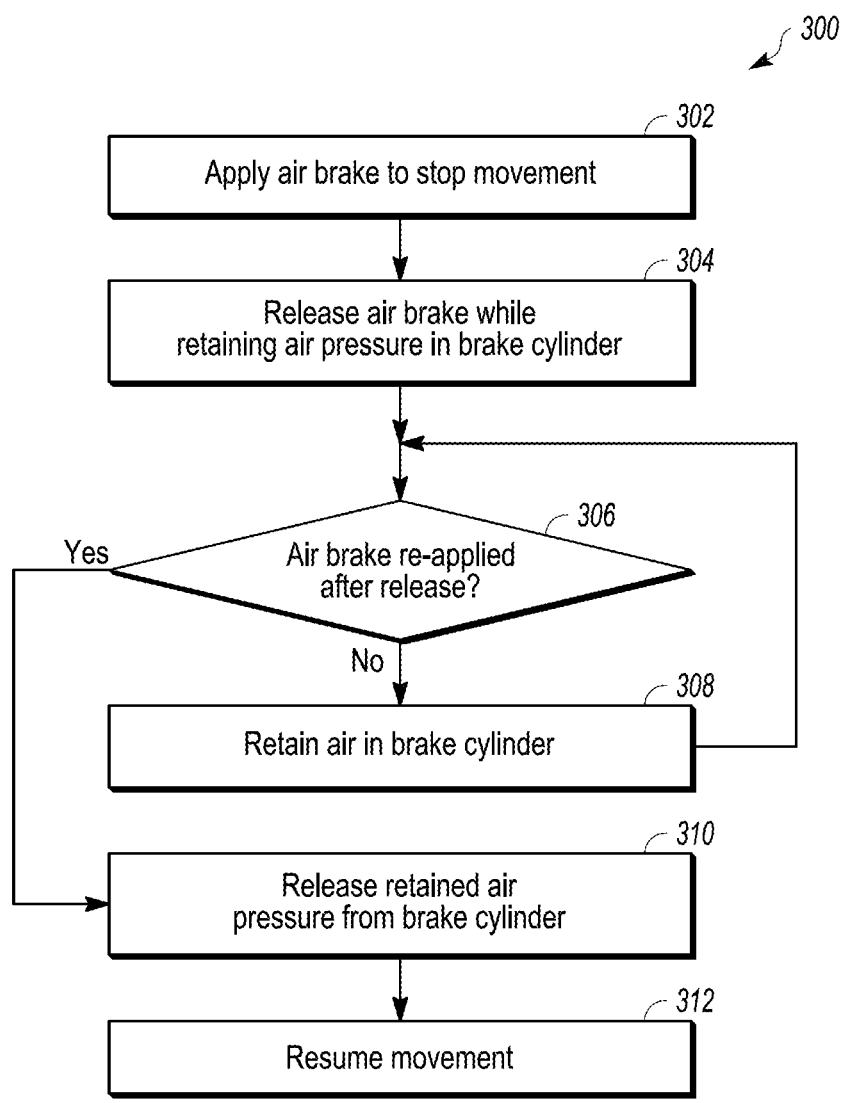
FIG. 3 illustrates a flowchart of one example of a method for actuating and re-setting a retainer valve assembly of an air brake system.

FIG. 3 illustrates a flowchart of one example of a method 300 for actuating and re-setting a retainer valve assembly of an air brake system. The method can represent operations performed to actuate one or more (or all) of the retainer valve assemblies in an air brake system following one application of the air brake system, retain air pressure within one or more (or all) of the brake cylinders, and to re-set the retainer valve assemblies responsive to another subsequent application of the brake system (to vent the retained air pressure and permit the vehicle system to resume movement).

At step 302, movement of a vehicle system may be stopped by applying one or more air brakes. Air pressure in a brake pipe of an air brake system onboard the vehicle system may be decreased to cause the reservoir(s) of the air brake system to direct air pressure into brake cylinder(s) of the air brake system. This air pressure in the brake cylinder(s) engages the air brake(s) against wheel(s) of the vehicle system to slow and stop movement of the vehicle system.

This brake application can be referred to as an initial brake application, but may not necessarily always be the very first application of brakes by the vehicle system. For example, the initial brake application can refer to a brake application that occurs while the retainer valve assemblies are not retaining air pressure within the brake cylinders, as described herein. The initial brake application can be a normal service brake application or an emergency brake application. An emergency brake application can involve the pressure in the brake pipe being reduced by more than the normal service brake application, and can require a longer period of time to re-charge the pressure within the air brake system following the brake application (than the normal service brake application).

At step 304, the air brake(s) that were applied at step 302 are released. The air brake(s) can be released by partially venting the air pressure out of the brake cylinder(s) to reduce the pressure inside the brake cylinder(s) and reduce the force applied to the air brake(s) against the wheel(s) of the vehicle system. The release of the air brakes after the initial application can be an operator release of the brakes. For example, the release of the air brake(s) at step 304 may be caused or initiated by an operator providing input to the controller (e.g., by pushing a button, pulling a lever, pressing a pedal, etc.). The release of the air brake(s) at step 304 may not be the release of the air brake(s) caused by venting the air pressure retained by the retainer valve assembly or assemblies out of the brake cylinder(s) (as described below in connection with step 310).

The air brake(s) can be released while the retainer valve assembly or assemblies retain a designated air pressure in the brake cylinder(s). For example, the retainer valve assemblies can allow air pressure to vent out of the brake cylinders until twenty pounds per square inch (or another amount) of air pressure remains in each of the brake cylinders. This retained air pressure keeps the brakes at least partially engaged with the wheels of the vehicle system. This can ensure that the vehicle system does not resume movement (e.g., down a grade on which the vehicle system stopped).

At step 306, a determination is made as to whether the air brake(s) are re-applied after the application at step 302 and the release of the air brake(s) at step 304. The air brake(s) in the brake pipe and/or reservoir(s) may increase (e.g., be re-charged) following the release of the air brakes at step 304. The air brakes may be re-applied by reducing the pressure in the brake pipe again after being at least partially re-charged. If the air brakes are re-applied at step 306, then the retainer valve assembly or assemblies may be re-set to allow the air brake(s) to be released and the vehicle system to resume movement. As a result, flow of the method can proceed toward step 310. But, if the air brakes are not re-applied at step 306, then the brake pipe and/or reservoir(s) may still be in the process of being re-charged with air pressure and the vehicle system may not be ready to resume movement. As a result, flow of the method can proceed toward step 308, where the retainer valve assembly or assemblies continue to retain at least the designated amount of air pressure in the brake cylinders. This can keep the air brakes engaged with the wheels (and prevent movement of the vehicle system). Flow of the method can return toward step 306 until the air brake(s) are re-applied or the method terminates.

At step 310, the retainer valve assembly or assemblies can be re-set to release the retained air pressure out of the brake cylinder(s). The retainer valve assemblies can be re-set responsive to a designated pneumatic condition in the air brake system occurring. This designated pneumatic condition can be the air brake system being re-applied after the initial application at step 302. Another example of a designated pneumatic condition can be the air pressure in the brake pipe and/or reservoir(s) reaching one or more designated thresholds (e.g., enough air pressure to apply a normal or emergency brake application). In another example, the designated pneumatic condition can occur when both the air pressure in the brake pipe and/or reservoir(s) reaching one or more designated thresholds and the air brake system being re-applied after the initial application at step 302.

The retainer valve assembly or assemblies can be pneumatically re-set, manually re-set, or automatically re-set (e.g., using one or more motors) due to the re-application of the brakes at step 306. The re-setting of the retainer valve assembly or assemblies can vent the air pressure in the brake cylinders out of the brake system to remove the pressure on the air brakes and allow the vehicle system to resume movement.

The retainer valve assembly or assemblies can release the retained air pressure such that the air pressure remaining in the brake cylinders may be no greater than the pressure of the ambient air outside of the vehicle system. For example, while the retainer valve assemblies may retain a designated air pressure (e.g., twenty pounds per square inch) within the brake cylinders, the re-setting of the retainer valve assemblies reduces the air pressure in the brake cylinders to a pressure that may be lower than the designated air pressure (but that may be greater than no air pressure).

At step 312, movement of the vehicle system can resume. Once the brakes are released following re-application of the air brakes at step 306 and the venting of the retained air pressure from the brake cylinders at step 310, the brakes may no longer be engaged with the wheels of the vehicle system. The vehicle system can then resume movement without locking up the wheels. Flow of the method can return toward step 302 or may terminate.

Figure 4:
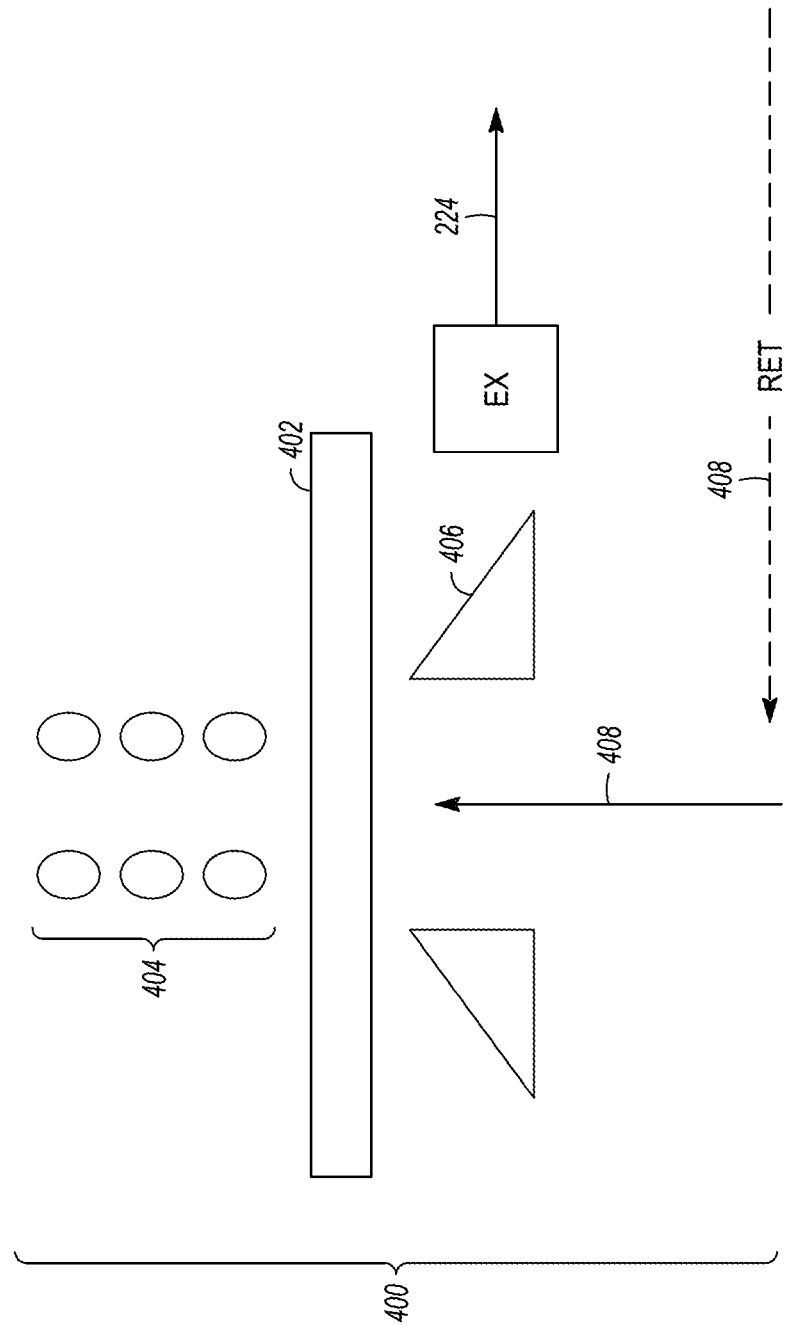
FIG. 4 illustrates one example of a retainer check valve of the retainer valve assembly shown in FIG. 2.

FIG. 4 illustrates one example of a retainer check valve 400 of the retainer valve assembly shown in FIG. 2. The retainer check valve can represent one embodiment of the retainer check valve, such as the one shown in FIG. 2. The retainer check valve retains the designated air pressure within a brake cylinder (e.g., twenty pounds per square inch or another pressure). For example, the retainer check valve can be at least one of the components that retains the designated air pressure in the brake cylinder to ensure that the air brake remains engaged following the initial brake application and release prior to the subsequent re-application of the air brake, as described above in connection with step 304 in the illustrated method.

The retainer check valve can include a diaphragm (or check valve) 402 disposed between a resilient body 404 (e.g., a spring) and an open-ended conduit 406. The conduit can be fluidly coupled with the brake cylinder. The resilient body provides a force on the diaphragm or check valve that may be counteracted by air flowing out of the conduit (e.g., onto an opposite side of the diaphragm or check valve). If air pressure flowing out of the conduit (e.g., the air pressure from the brake cylinder, labeled as "RET 408" in FIG. 4 and also referred to as cylinder exhaust) exerts a greater force on the bottom side of the diaphragm or check valve than the force applied to the opposite upper side of the diaphragm or check valve by the resilient body, then the air pressure flowing out of the conduit may be vented out of the air brake system as the exhaust 224 in FIG. 4. This exhaust can be vented out of the air brake system via the exhaust shown in FIG. 2 ("EX" in FIG. 4). The flows of air pressure in the figures can represent the air that flows, can represent the conduits through which the air flows, or can represent both the flowing air and the conduits through which the air flows.

Figure 5:
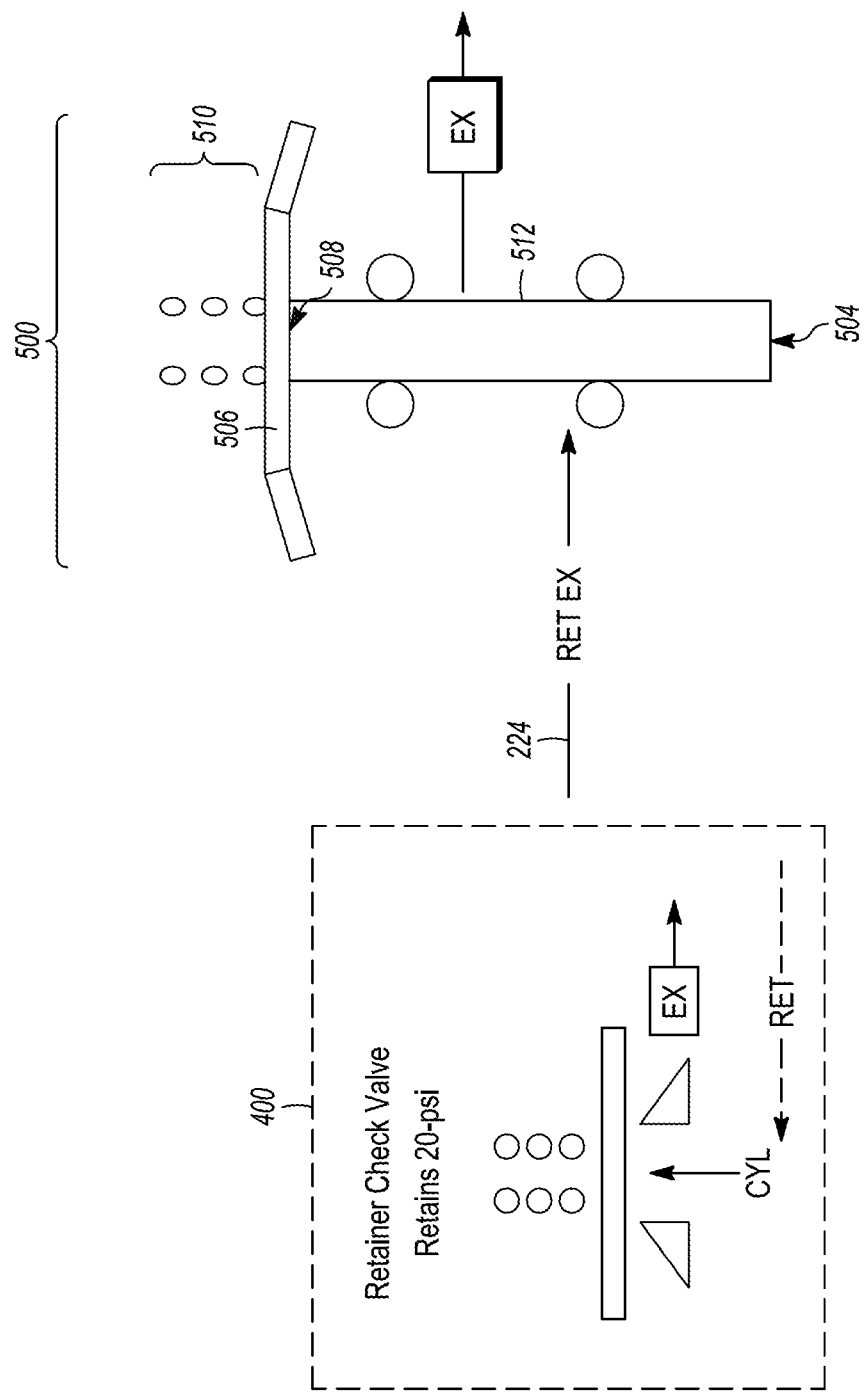
FIG. 5 illustrates a lock-up assembly of the retainer valve assembly shown in FIG. 2 in a release state.
Figure 6:
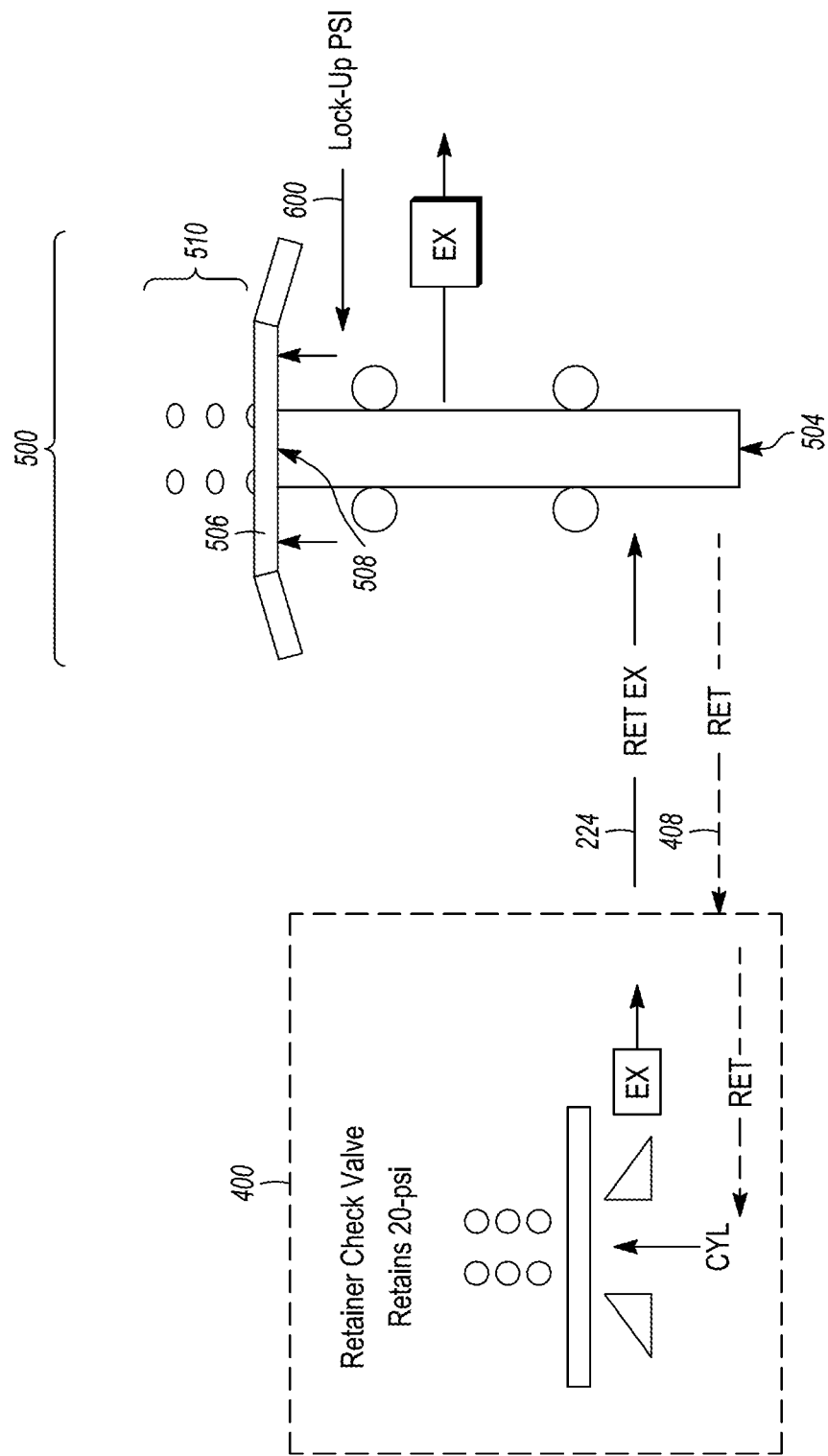
FIG. 6 illustrates the lock-up assembly shown in FIG. 5 in a pressurized state.

FIG. 5 illustrates a lock-up assembly 500 of the retainer valve assembly shown in FIG. 2 in a release state. FIG. 6 illustrates the lock-up assembly shown in FIG. 5 in a pressurized state. The lock-up assembly shown in FIGS. 5 and 6 can represent one embodiment of the lock-up assembly, such as the one shown in FIG. 2. The lock-up assembly controls the path of air pressure that may be exhausted from the brake cylinder. The lock-up assembly can be fluidly coupled with the retainer check valve and the brake cylinder (e.g., by one or more conduits).

In a release state (shown in FIG. 5), the lock-up assembly receives the air pressure that may be exhausted from the brake cylinder and directs this air pressure that may be received to the exhaust of the air brake system. In a pressurized or activated state FIG. 6, however, the lock-up assembly receives the air pressure that may be exhausted from the brake cylinder and directs this air pressure to the retainer check valve (shown in FIG. 4). The air pressure received by the lock-up assembly may be exhausted from the brake cylinder due to the initial brake release (e.g., at step 304 in the method) or the subsequent brake release (e.g., at step 310 in the method), or due to another release of the brake.

The lock-up assembly includes a lock-up spool 512 that represents a conduit that may be actuated between the release state and the pressurized/activated state. For example, the lock-up spool may move up in the perspective of FIG. 6 while in the pressurized or activated state, and may move down in FIG. 5 while in the release state. The lock-up spool may alternate between the release and pressurized/activated states responsive to manual actuation of an input device (e.g., a button), responsive to a pneumatic condition occurring, or the like, as described herein.

The lock-up spool receives lock-up air pressure from the input device and directs the lock-up air pressure to one side of a diaphragm 506. A resilient body 510 (e.g., a spring) may be disposed on the opposite side of this diaphragm. This resilient body and air pressure 600 (when directed through the spool) directed onto the diaphragm by the spool apply opposing forces on the diaphragm. When little to no lock-up air pressure may be applied to the bottom side of the diaphragm via the spool, the resilient body forces the diaphragm downward. This movement of the diaphragm can close off or seal one or more conduits leading to the retainer check valve (shown in FIG. 4). As a result, the brake cylinder exhaust may be directed by the conduits to the system exhaust and not to the retainer check valve.

In the pressurized or activated state (shown in FIG. 6), the spool of the lock-up assembly can apply a force onto the diaphragm that counteracts the force applied by the resilient member, and can move the diaphragm (as shown in FIG. 6). Upon the release of the brake application, a flow of an air pressure 408 that may be exhausted from the brake cylinder ("RET408" in FIG. 6) is directed through the lock-up assembly while the diaphragm may be forced, biased, or moved toward the resilient body. This flow of air pressure may be directed to the retainer check valve. As described above, the retainer check valve can retain up to a designated amount of this air pressure, with an additional or overage amount of the air pressure vented out of the retainer check valve exhaust. A suitable amount of air pressure in one embodiment may be up to around twenty pounds per square inch, but in other embodiments may be selected with reference to various end use parameters.

The lock-up assembly may be manually actuated to the pressurized/activated state in one embodiment. For example, the lock-up piston can be coupled with the input device, such as a button, lever, switch, or other device, that can be manually actuated to change the state of the lock-up piston to the pressurized/activated state.

Figure 7:
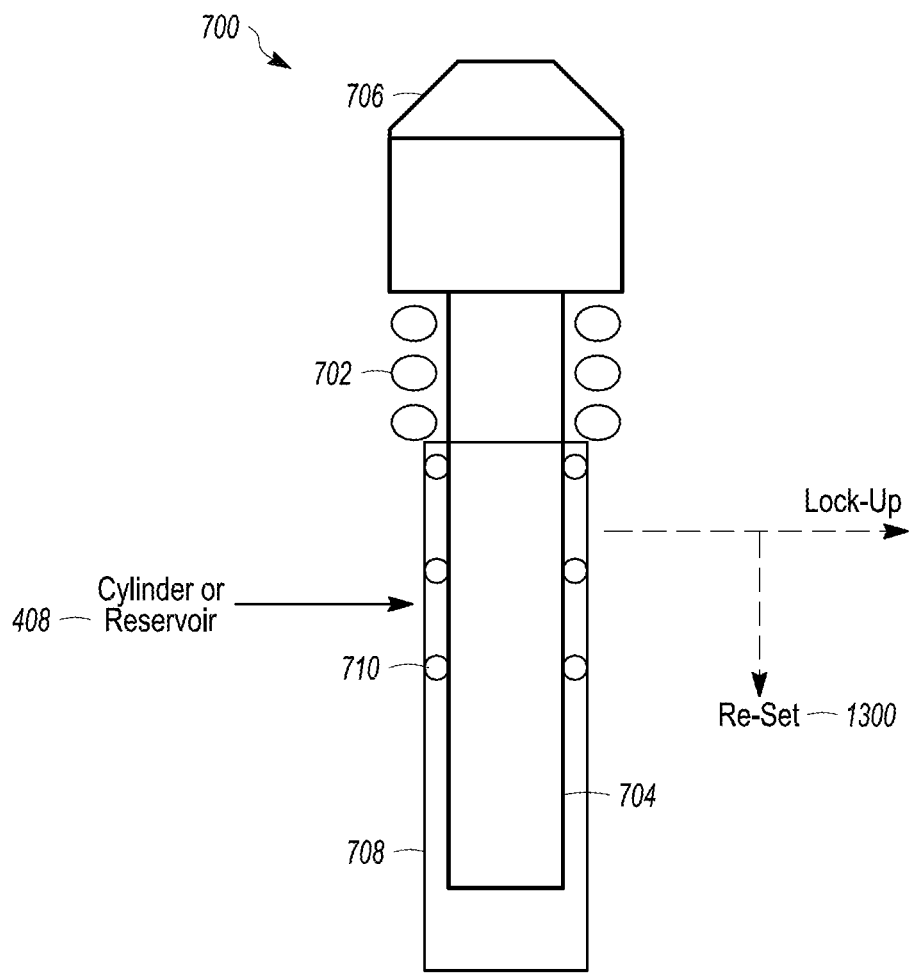
FIG. 7 illustrates one example of an input device that can be used for manual actuation of the lock-up assembly.
Figure 8:
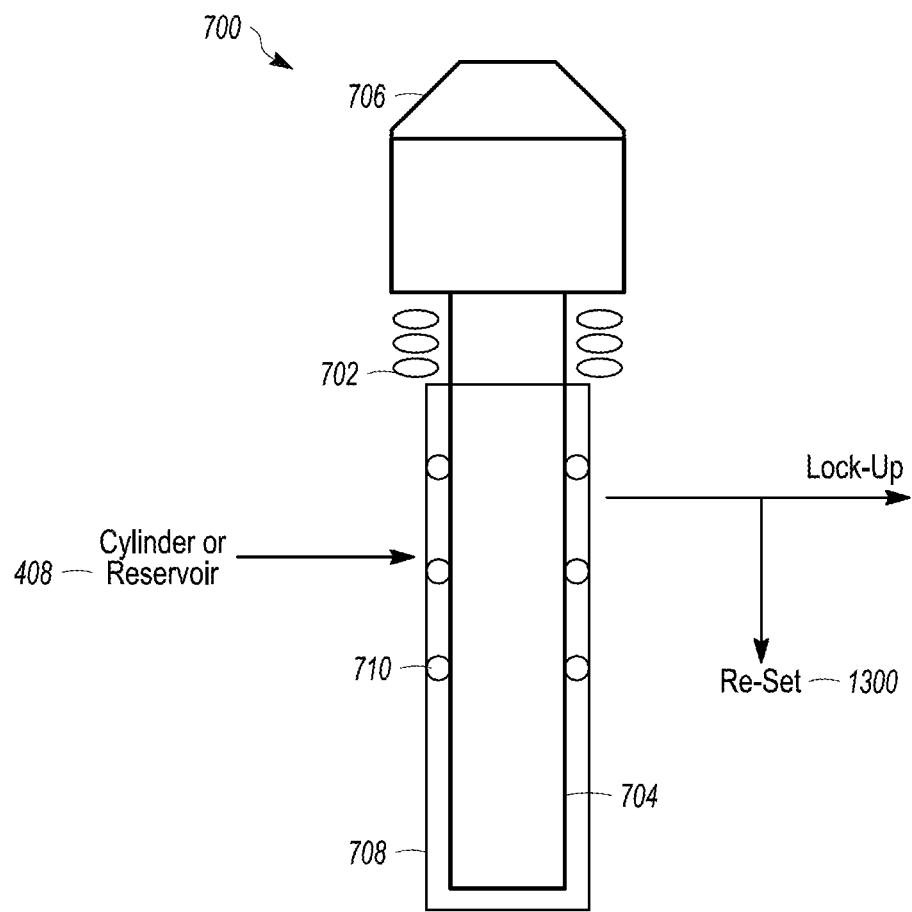
FIG. 8 illustrates the input device shown in FIG. 7.
Figure 9:
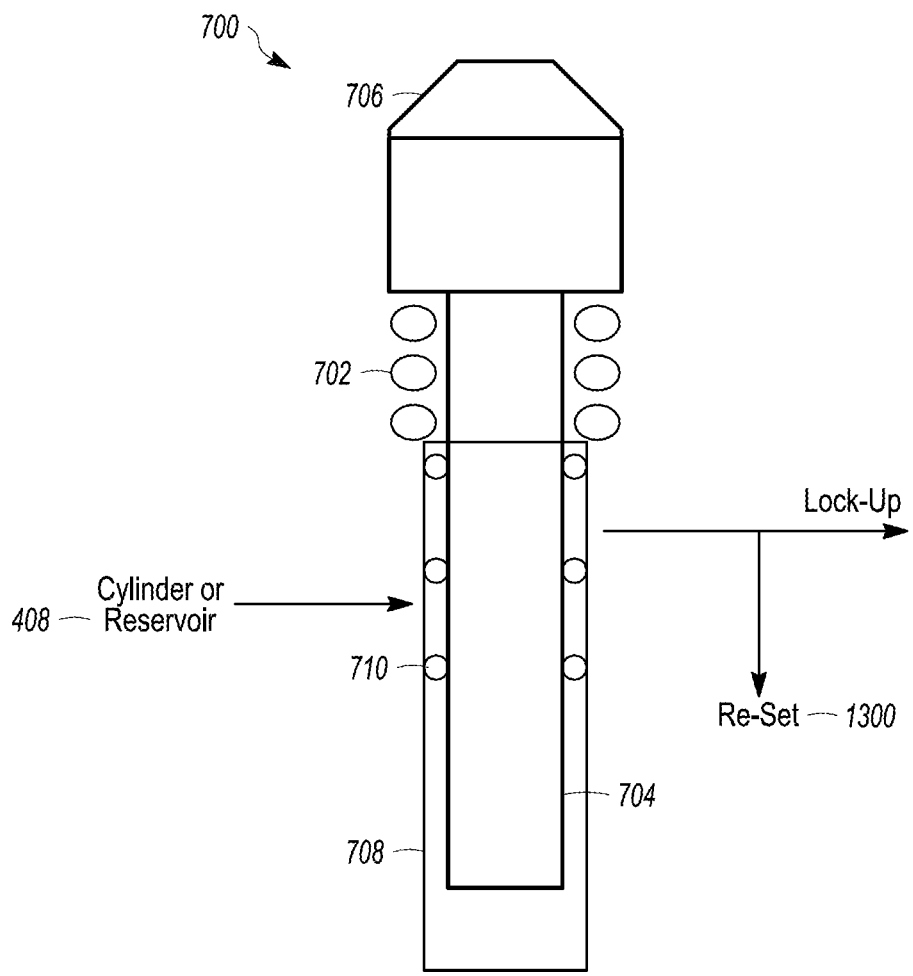
FIG. 9 also illustrates the input device shown in FIG. 7.

FIGS. 7 through 9 illustrate one example of an input device 700 that can be used for manual actuation of the lock-up assembly. The input device shown in FIGS. 7 through 9 can represent one embodiment of the input device, such as the one shown in FIG. 2. The input device shown in FIGS. 7 through 9 can represent or include a push button 706 that can be manually actuated by an operator (e.g., in the downward direction of FIGS. 7 through 9). The input device can be fluidly coupled with the lock-up assembly by one or more of the conduits shown in FIG. 2 and may be disposed between the brake cylinder or the reservoirs and the lock-up and reset assemblies.

The input device includes a resilient body 702 coupled with a piston 704 that can be joined with a button or another manually-actuatable surface or device. The piston can be disposed inside and move within a conduit 708 that may be fluidly coupled with the lock-up assembly. The conduit can be fluidly coupled with and disposed between the brake cylinder or reservoirs and the lock-up and re-set assemblies. This conduit can be sealed with the piston by one or more seals 710 (such as O-rings). The resilient body can be a spring or other body that applies a bias onto the piston toward the button, as shown in FIG. 7. The state of the input device in FIG. 7 can be referred to as a default or released state. An operator can press the button to move the piston against or toward the resilient body, as shown in FIG. 8. The state of the input device shown in FIG. 8 can be referred to as a pressurized or activated state.

Prior to or following the initial brake application (e.g., at step 302), the input device can be actuated by an operator pressing the button to transition the input device from the released state (FIG. 7) to the activated state (FIG. 8). In this state, the input device directs the cylinder or reservoir to the lock-up piston of the lock-up assembly and to the re-set assembly, as described above. This can pressurize the lock-up assembly, which directs the cylinder exhaust to the retainer check valve, as described above.

The piston may be returned to the released state by the resilient body as shown in FIG. 9. In this state following the activation state of FIG. 8, the brake cylinder or reservoir may be isolated from the lock-up pressure. Stated differently, with the lock-up cavity pressurized, the cylinder exhaust may be directed to the retainer check valve, but the lock-up pressure may be reduced or prevented from venting via the input device. The cylinder exhaust may be directed (by the lock-up assembly) to the retainer check valve upon release of the brake application (e.g., step 310).

Figure 10:
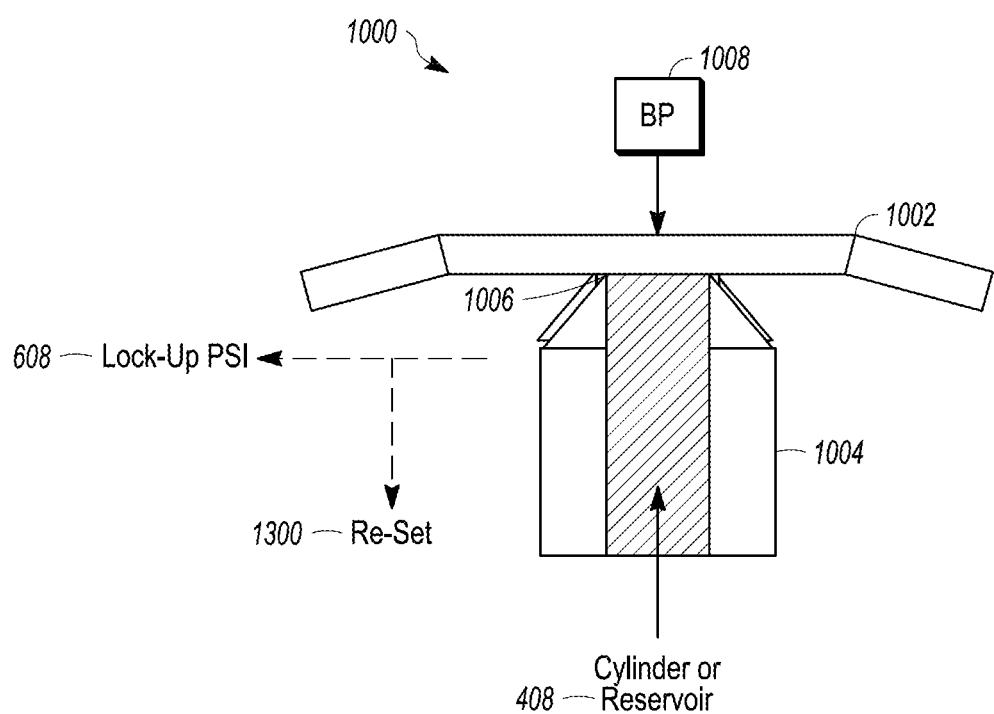
FIG. 10 illustrates another example of an input device that can be used for pneumatic actuation of the lock-up assembly.
Figure 11:
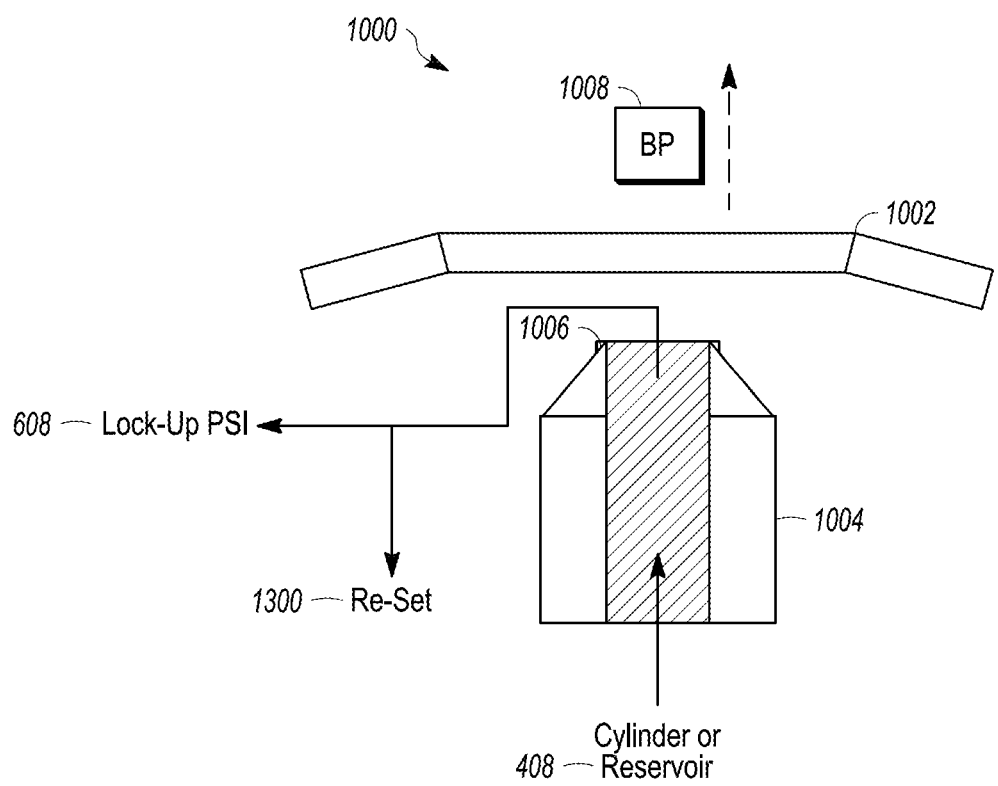
FIG. 11 illustrates the input device shown in FIG. 10.
Figure 12:
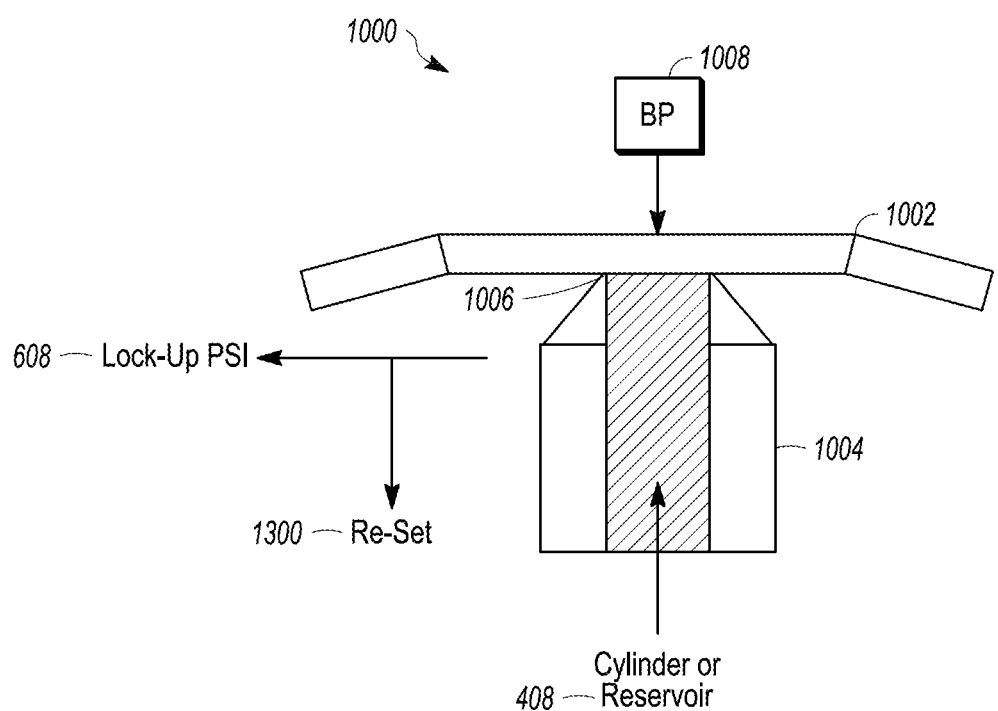
FIG. 12 also illustrates the input device shown in FIG. 10.
Figure 13:
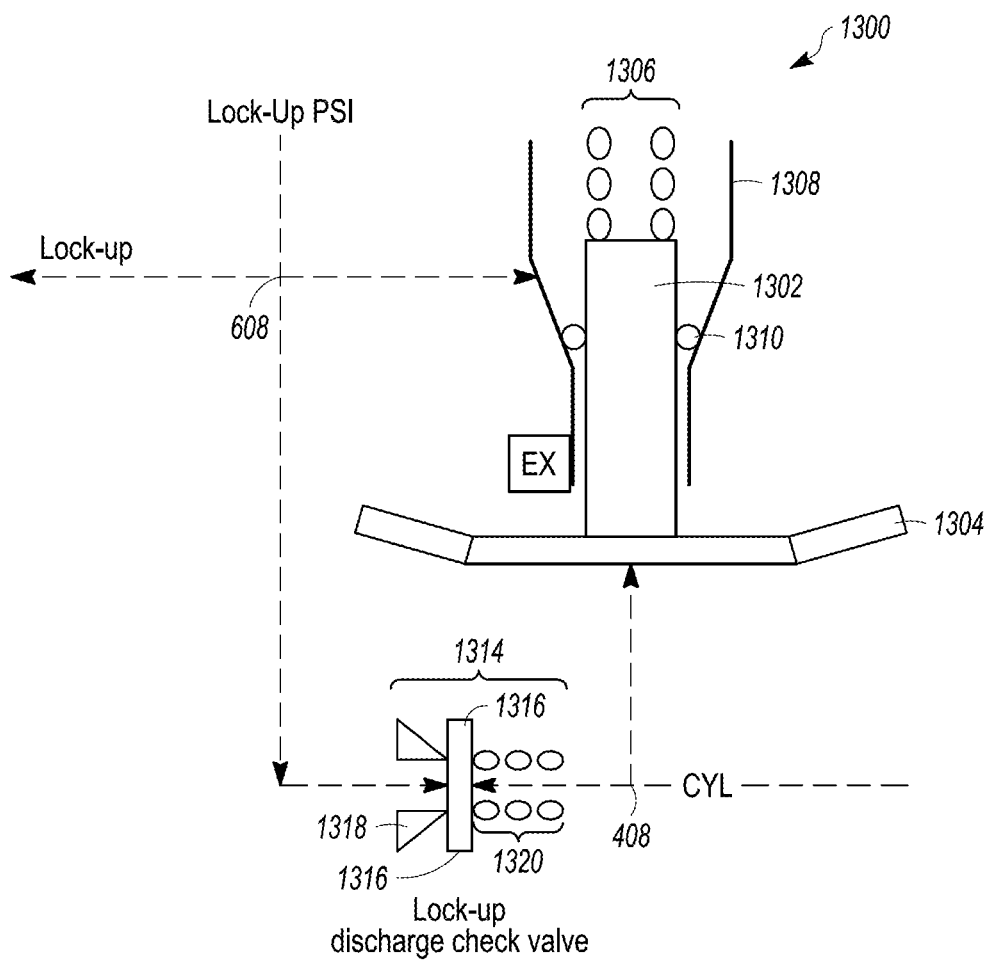
FIG. 13 illustrates one example of operation of a re-set device.

FIGS. 10 through 12 illustrate another example of an input device 1000 that can be used for pneumatic actuation of the lock-up assembly. The input device shown in FIGS. 10 through 12 can represent another embodiment of the input device rather than the one shown in FIG. 2. The input device shown in FIGS. 10 through 12 can be fluidly coupled with the lock-up assembly by one or more of the conduits shown in FIG. 2 and may be disposed between the brake cylinder or reservoirs and the lock-up assembly.

The input device includes a diaphragm 1002 that may be coupled with a conduit 1004. The conduit can be fluidly coupled with the brake cylinder or reservoir such that the conduit receives the air pressure. The conduit includes an open end 1006 that directs this air pressure to one side of the diaphragm. The opposite side of the diaphragm receives brake pipe pressure 1008 from the air pressure in the brake pipe (such as shown in FIG. 2, with the brake pipe or brake pipe pressure represented as BP in FIGS. 10 through 12). Prior to initial application of the brake (e.g., prior to step 302), the brake pipe pressure may press or move the diaphragm downward or in a direction that seals off the open end of the conduit. This can prevent or reduce air pressure from flowing out of the conduit to the lock-up assembly as lock-up pressure.

When the brake pipe may be vented during the initial brake application (e.g., at step 302), the reduced brake pipe pressure can cause the air pressure to move the diaphragm away from the open end of the conduit (shown in FIG. 11). As a result, the air pressure can flow out of the conduit to the lock-up and re-set assemblies as the lock-up pressure, as shown in FIG. 11. As described above, this can pressurize the lock-up assembly and direct cylinder exhaust to the retainer check valve upon release of the initial brake application (e.g., at step 304).

During recharging of the brake pipe (e.g., during and/or after step 304), the brake pipe pressure exerted on the diaphragm increases to cause the diaphragm to move toward and close the open end of the conduit, as shown in FIG. 12. This isolates the brake cylinder or reservoir from the lock-up assembly. As a result, the lock-up pressure may be bottled up to keep the lock-up assembly in the pressurized state until the subsequent brake application (e.g., at step 306).

FIGS. 13 through 19 illustrate one example of operation of a re-set device 1300. The re-set device shown is one embodiment of the re-set device having a feature set selected based on end use parameters. The re-set device includes a re-set spool or conduit 1302 that may be biased toward a diaphragm 1304 by a resilient body 1306. The spool can be a tube having opposite open ends and that may be disposed within an outer conduit 1308. The spool can be sealed to the outer conduit by one or more seals 1310, such as O-rings. The seal(s) can prevent air pressure from passing between the spool and the outer conduit. The resilient body can represent a spring or other body that applies a bias force on the spool toward the diaphragm.

The re-set device also includes a check valve 1314 that may be fluidly coupled with the brake cylinder and with the lock-up assembly. The check valve can be disposed on a side of the diaphragm that may be opposite the spool. This check valve includes a diaphragm or check valve 1316 with a conduit 1318 that may be fluidly coupled with the lock-up assembly (to receive the lock-up pressure) on one side of the diaphragm or check valve and a resilient member 1320 (e.g., a spring) on the opposite side of the diaphragm or check valve. The side of the diaphragm or check valve that may be closer to the resilient member 1320 may be fluidly coupled with the brake cylinder and with the side of the or check valve 1304 that may be opposite the spool 1302.

The spool of the re-set device may be fluidly coupled with the lock-up assembly such that an open end of the spool that may be opposite of the diaphragm 1304 and closer to the resilient member 1306 than the other end of the spool receives the lock-up pressure from the lock-up assembly. This lock-up pressure increases the force applied to the diaphragm 1304 due to both the resilient member 1306 and the lock-up pressure applying forces onto the diaphragm in a direction oriented away from the spool of the re-set device.

The re-set device operates to vent the lock-up pressure out of the air brake system (e.g., via the system exhaust) upon or responsive to the subsequent brake application (e.g., at step 310). The re-set device is shown in a released state in FIG. 13. In this state, because the brake has not been engaged, there may be little to no air pressure applied to one side of the diaphragm 1304 by the cylinder pressure and there may be little to no air pressure applied to the opposite side of the diaphragm by the lock-up pressure.

Figure 14:
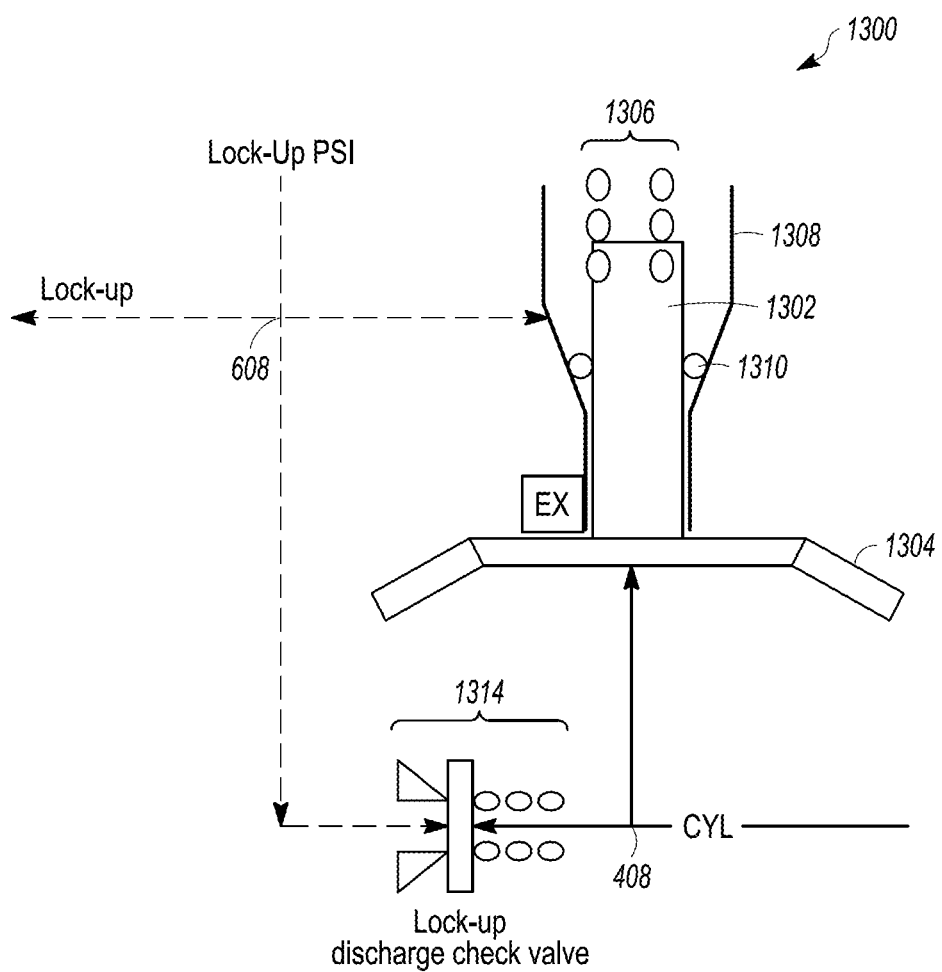
FIG. 14 also illustrates operation of the re-set device shown in FIG. 13.

When the air brake is applied, the air pressure in the cylinder increases and at least some of this increased air pressure may be directed as the cylinder to the side of the diaphragm 1304 that may be opposite of the re-set spool 1302 and to the lock-up check valve 1314, as shown in FIG. 14. This increased air pressure can bias (e.g., force) the diaphragm 1304 toward the re-set spool 1302 and cause the re-set spool 1302 to at least partially compress the resilient body 1306. But, because no lock-up air pressure is directed out of the lock-up assembly, there may be no lock-up air pressure to be vented (or to be applied to the opposite side of the diaphragm 1303.

Figure 15:
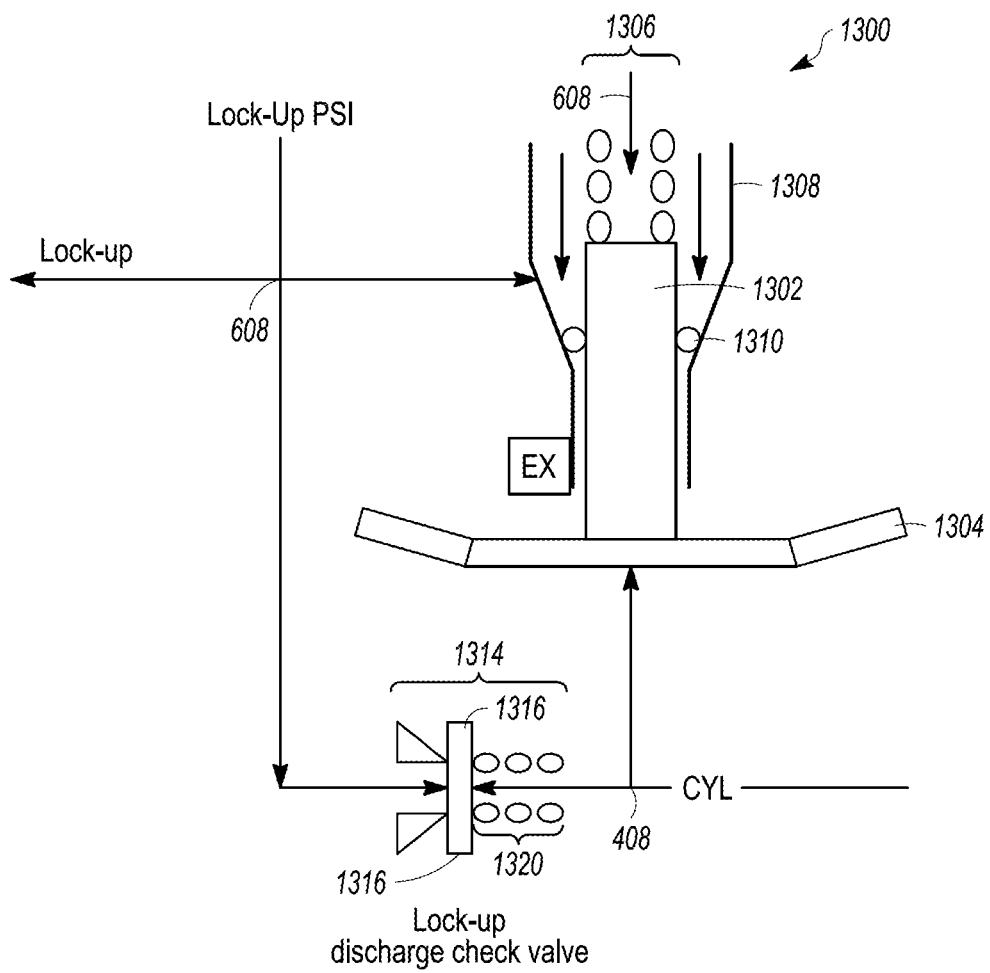
FIG. 15 also illustrates operation of the re-set device shown in FIG. 13.

As shown in FIG. 15, when the lock-up assembly is in the activated or pressurized state (FIGS. 8, 9, 11, and/or 12), a first portion of the lock-up air pressure may be directed to the re-set spool 1302 in a direction that may be opposite the direction in which the cylinder may be applied to the same diaphragm 1304. A second portion of the lock-up air pressure may be directed by conduits onto the diaphragm or check valve 1316 of the re-set check valve 1314 in a direction that opposes the direction in which the cylinder may be directed onto the same diaphragm or check valve 1316. The lock-up air pressure may be greater than, the same as, or substantially the same as (e.g., within 1-3%) of the pressure of the cylinder. The force generated on the diaphragm 1304 by a combination of the resilient body 1306 and the lock-up pressure may be greater than the force generated on the opposite side of the diaphragm 1304 by the cylinder.

Figure 16:
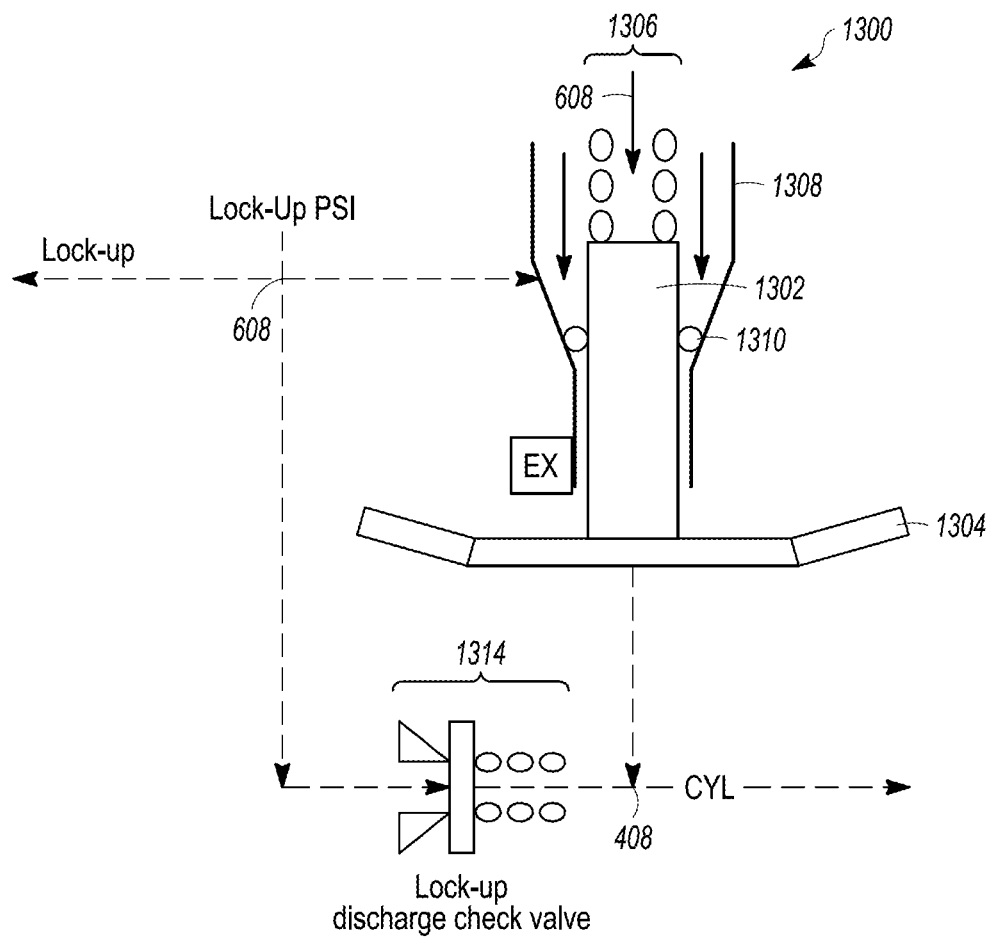
FIG. 16 also illustrates operation of the re-set device shown in FIG. 13.

As shown in FIG. 16, when the brake application is released (e.g., at step 304), the cylinder pressure decreases. The lock-up pressure, however, remains greater than the cylinder pressure. The lock-up pressure can flow through the check valve 1314 until the lock-up pressure on a side of the check valve 1314 that may be opposite the cylinder pressure decreases to a designated pressure.

Figure 17:
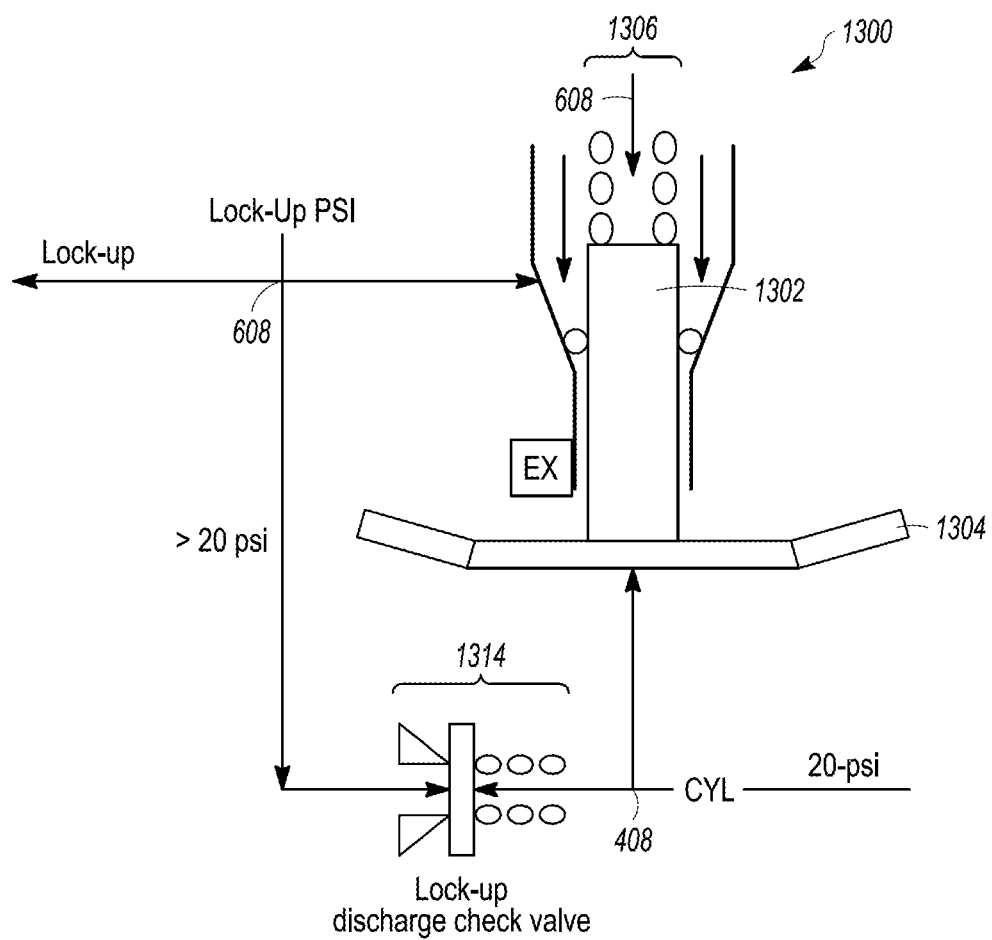
FIG. 17 also illustrates operation of the re-set device shown in FIG. 13.

As shown in FIG. 17, the cylinder pressure is vented through the system exhaust to a designated pressure (e.g., twenty pounds per square inch) by the retainer check valve shown in FIG. 4 (as described above). The lock-up check valve 1314 allows the lock-up pressure to vent (through the system exhaust) to another greater designated pressure.

Figure 18:
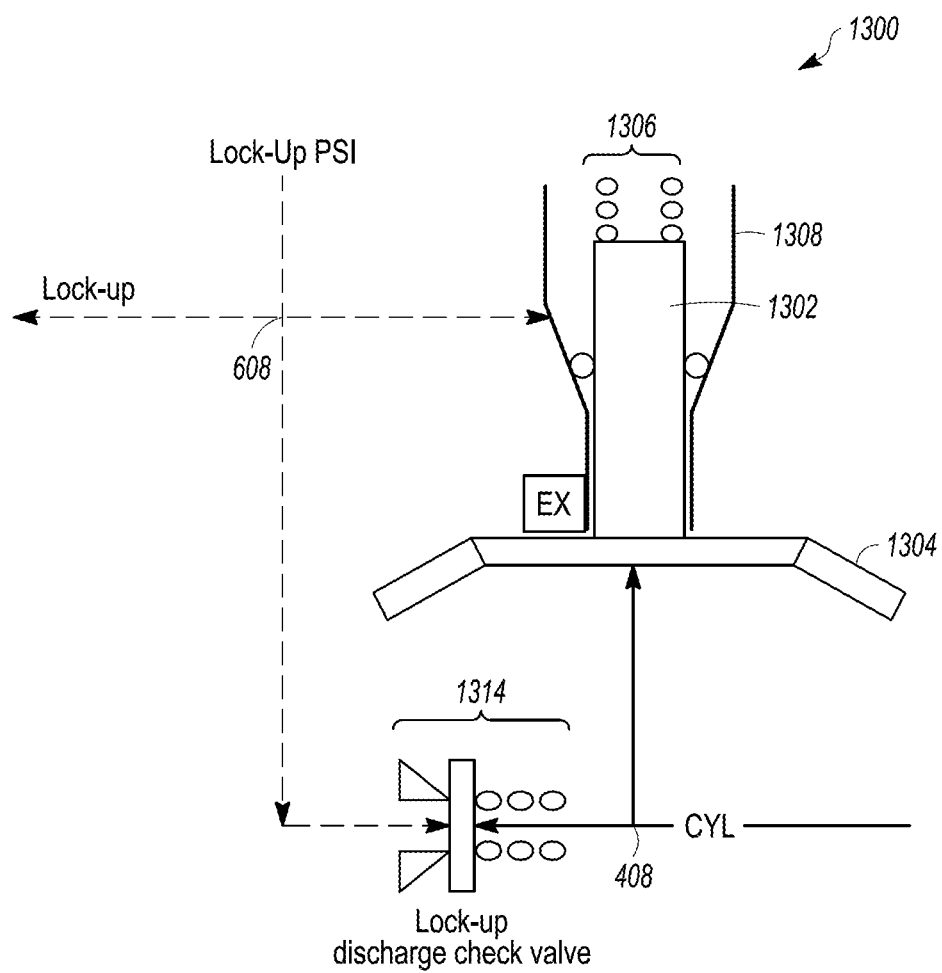
FIG. 18 also illustrates operation of the re-set device shown in FIG. 13.
Figure 19:
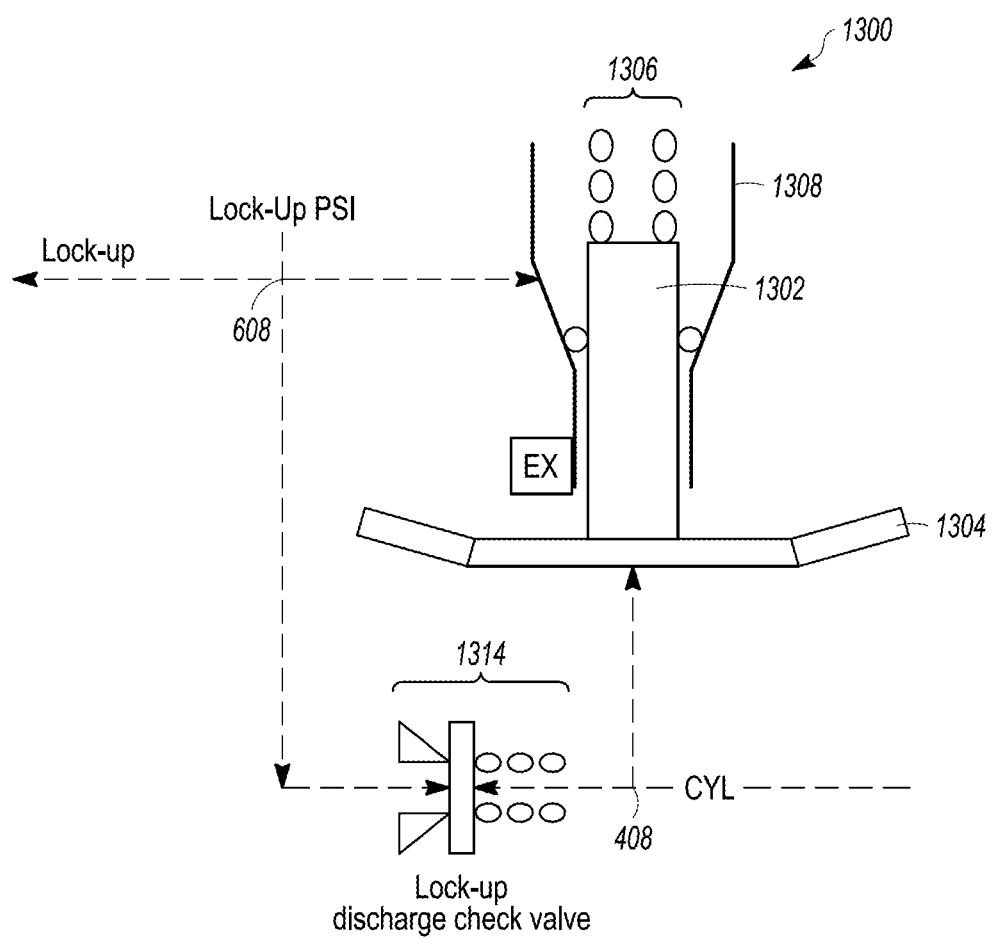
FIG. 19 also illustrates operation of the re-set device shown in FIG. 13.

The subsequent brake application (e.g., at step 306) can cause the cylinder pressure to increase above the lock-up pressure, as shown in FIG. 18. The higher cylinder pressure can force the diaphragm toward the conduit and the re-set spool. This movement may cause the re-set spool to vent the lock-up pressure to exhaust at the re-set spool. The re-set spool can then vent the lock-up pressure, and the lock-up spool can re-set and direct the cylinder exhaust to vent out of the system exhaust. The release of this subsequent brake application can cause the lock-up pressure to be the same or substantially the same as the cylinder pressure, as shown in FIG. 19. A retainer check valve assembly 102 can then return to operation where the cylinder pressure is not retained within the cylinder.

One or more embodiments of the retainer valve assemblies described herein may be added or otherwise retrofitted to existing manually controlled retainer valves. For example, some known retainer valves are manually switched by an operator between a closed state (where a designated cylinder pressure may be retained within the cylinder, such as twenty pounds per square inch) and an open state (where the cylinder pressure may be no longer retained in the cylinder). At least one embodiment of the retainer valve assembly can be added to such a manually controlled retainer valve to provide for a retainer valve assembly that operates without requiring such manual intervention.

Figure 22:
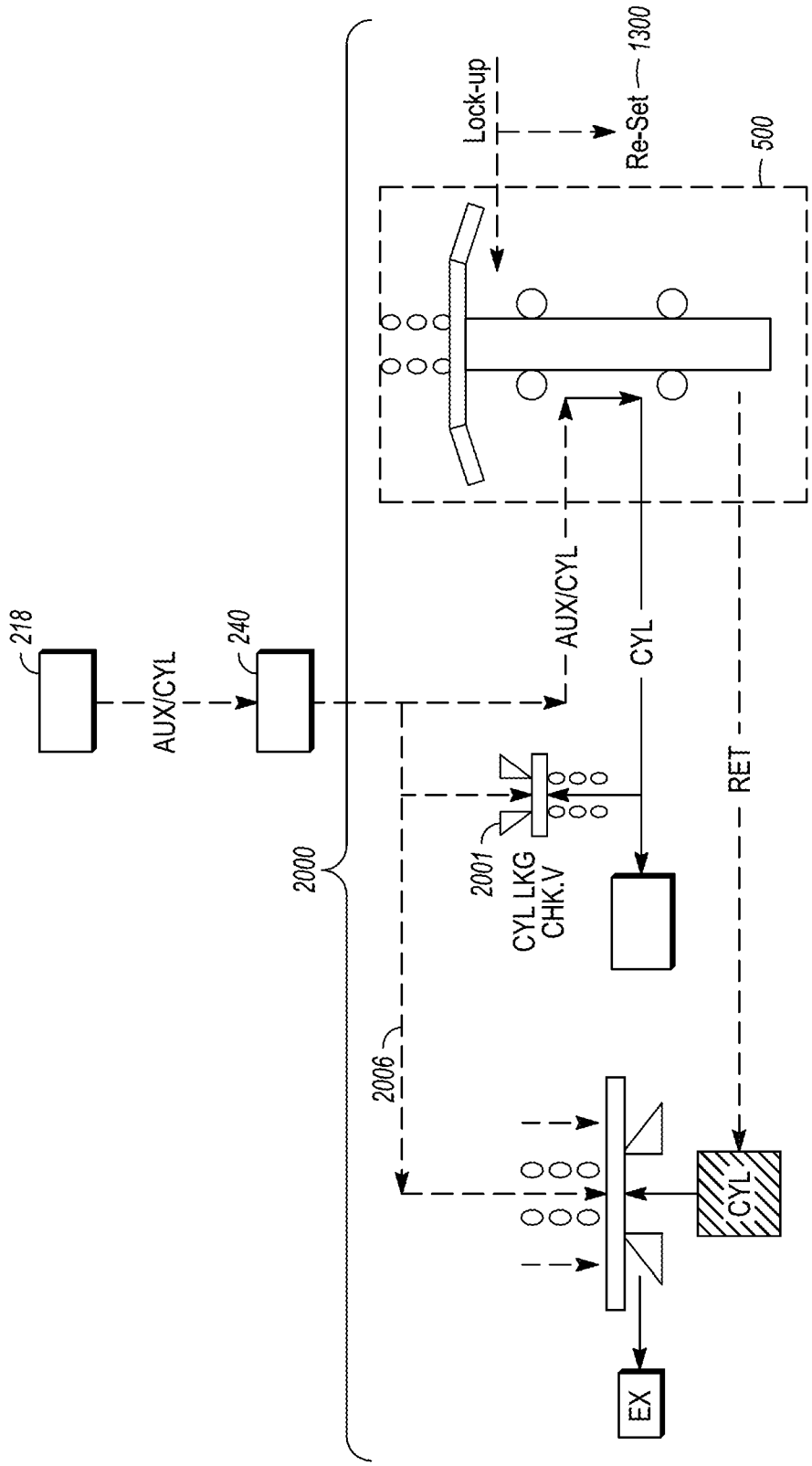
FIG. 22 illustrates another example of a retainer valve assembly.
Figure 23:
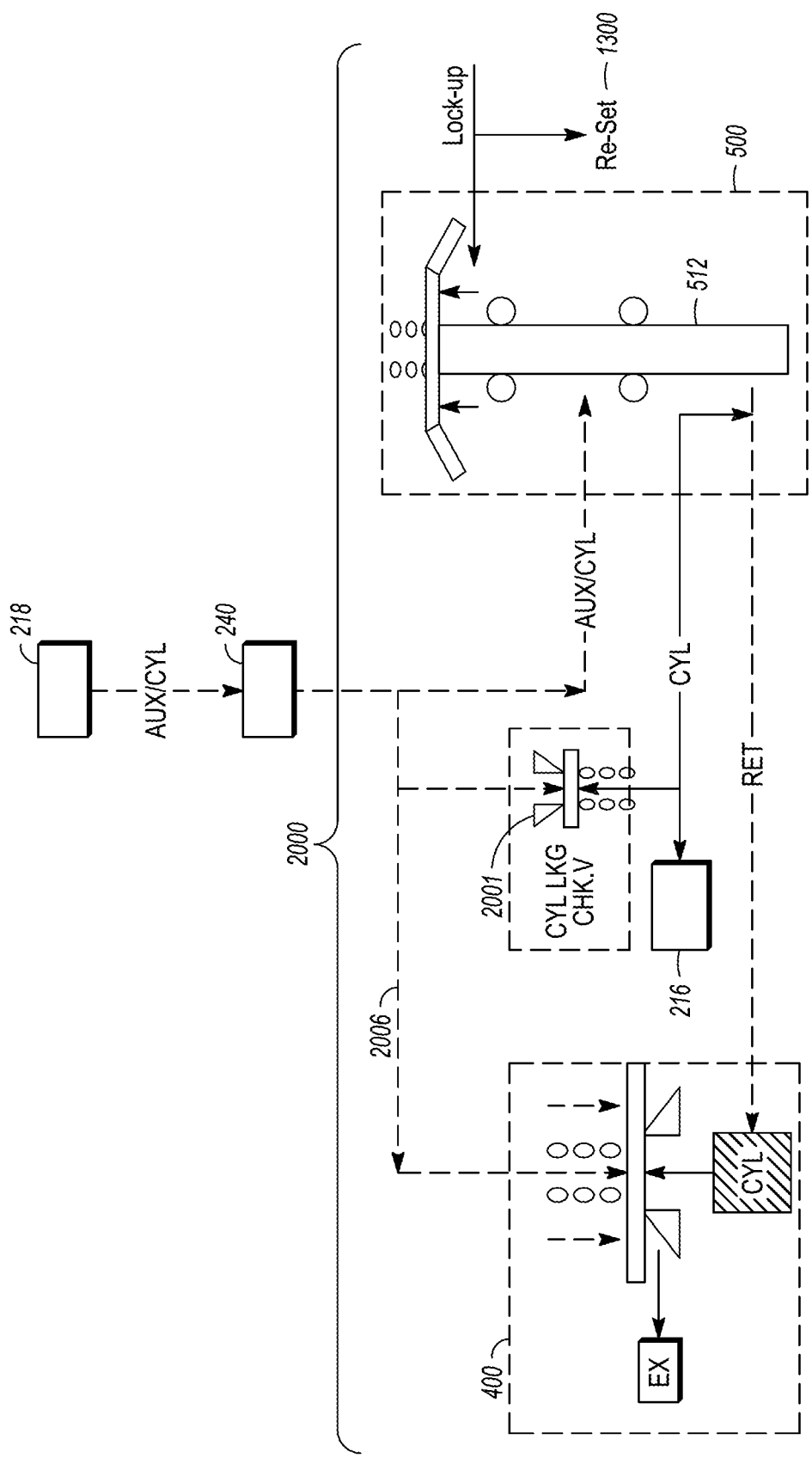
FIG. 23 illustrates the retainer valve assembly shown in FIG. 22.
Figure 24:
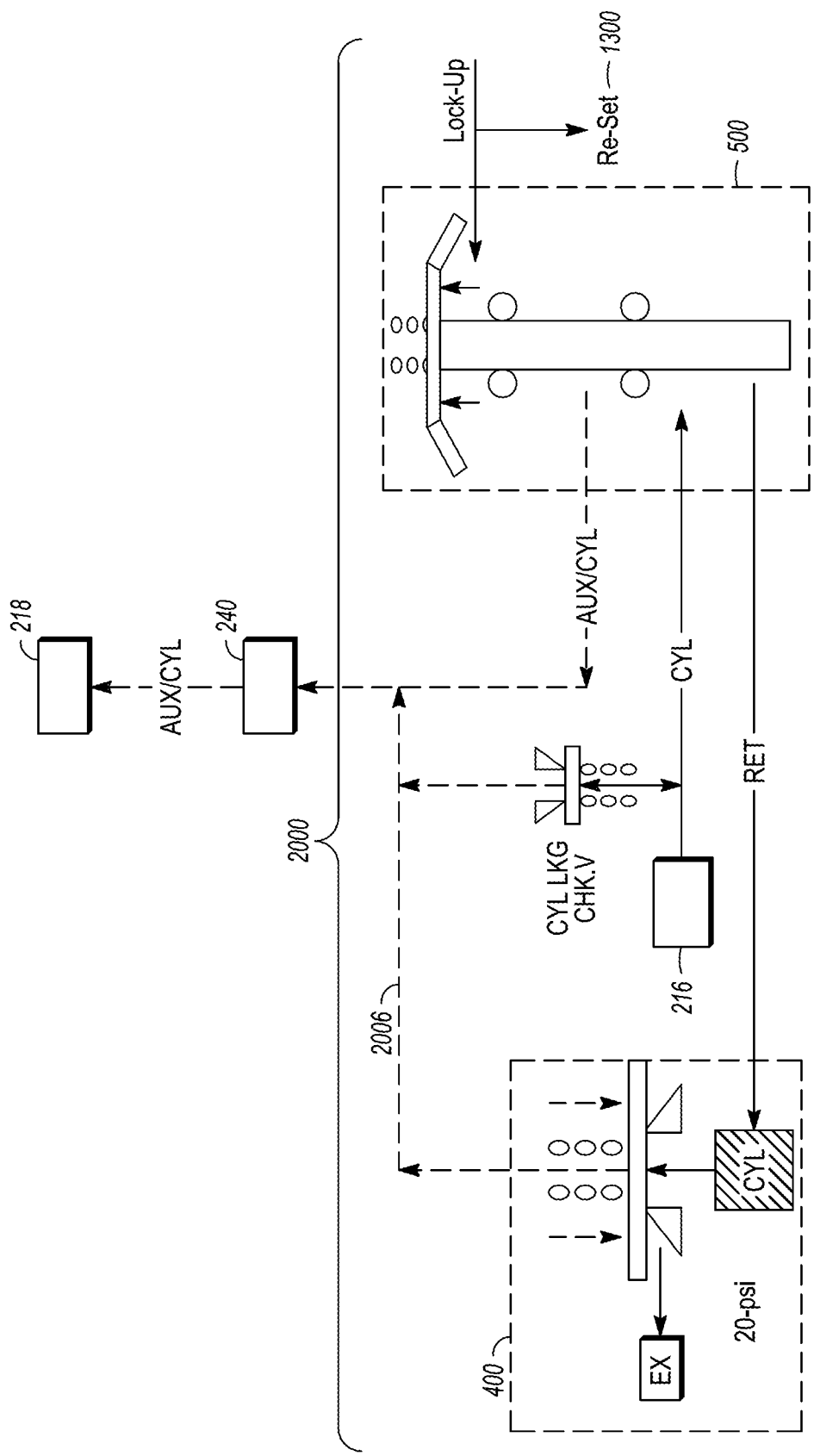
FIG. 24 also illustrates the retainer valve assembly shown in FIG. 22.

FIGS. 22 through 24 illustrate another example of a retainer valve assembly 2000. The retainer valve assembly can represent one embodiment of a retainer valve assembly, such as the one shown in FIG. 1. The retainer valve assembly can be retrofitted or otherwise added to an existing manual release valve 240. The retainer valve assembly includes the lock-up assembly, the re-set assembly, the cylinder leakage check valve 2001, and the retainer check valve described above.

Figure 20:
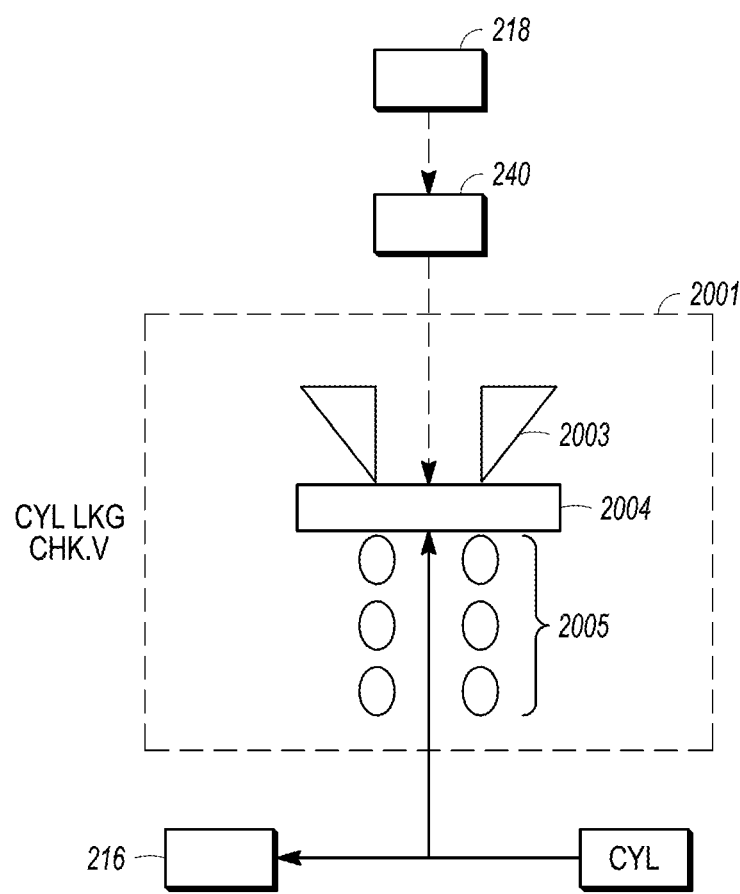
FIG. 20 illustrates one example of a cylinder leakage check valve of the retainer valve assembly shown in FIG. 22.

FIG. 20 illustrates one example of a cylinder leakage check valve 2001 of the retainer valve assembly shown in FIG. 22. The cylinder leakage check valve allows the connection from auxiliary reservoir to cylinder in the event that cylinder pressure decreases due to leakage out of cylinder.

The cylinder leakage check valve can include a diaphragm (or check valve) 2004 disposed between a resilient body 2005 (e.g., a spring) and an open-ended conduit 2003. The conduit can be fluidly coupled with the brake cylinder and auxiliary reservoir.

The resilient body provides a force on the diaphragm (or check valve) that may be counteracted by air flowing out of the conduit auxiliary reservoir during a brake application (e.g., onto an opposite side of the diaphragm). If air pressure flow out of the conduit (e.g., the air pressure from the brake cylinder, labeled as "CYL") and the force generated by resilient body in FIG. 20 exerts a greater force on the diaphragm (or check valve) than the force applied to the opposite side of the diaphragm (or check valve) by the auxiliary reservoir, then the pressures are isolated from one another.

Figure 21:
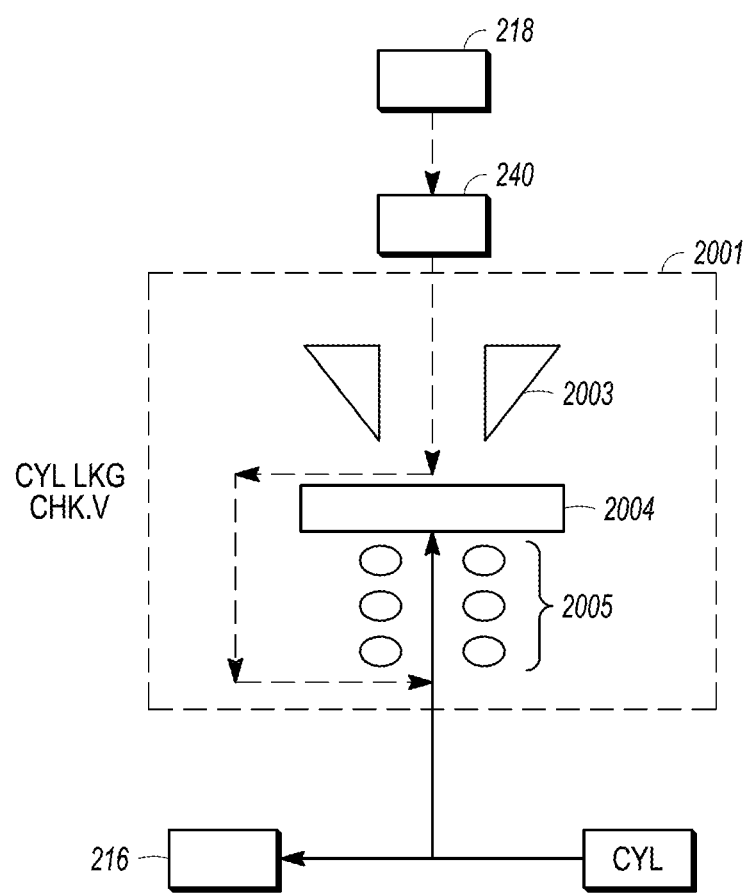
FIG. 21 also illustrates the retainer valve assembly shown in FIG. 20.

As shown in FIG. 21, if air pressure flow out of the conduit (e.g., the air pressure from the brake cylinder, labeled as "CYL" and the force generated by resilient body in FIG. 20 exerts a lower force on the diaphragm (or check valve) than the force applied to the opposite side of the diaphragm (or check valve) by the auxiliary reservoir, then the diaphragm (or check valve) will open and will allow flow from auxiliary reservoir to the cylinder.

As shown in FIG. 22, the lock-up assembly can be fluidly coupled with the control valve and the manual release valve such that the auxiliary reservoir air pressure 2006 (similar to the reservoirs shown in FIG. 2) and the brake cylinder pressure flow into the assembly.

FIG. 23 shows with the lock-up assembly in the activated state in which the auxiliary reservoir may be isolated from the cylinder. The auxiliary reservoir pressure and the resilient body in the retainer check valve assembly reduce or prevent venting of the cylinder. The function of the cylinder leakage check valve may be as described above.

FIG. 24 shows the retention of the cylinder pressure following the release of the brake application. The auxiliary (AUX/CYL) pressure is directed to exhaust through the manual release valve and the control valve. The retainer check valve assembly vents the cylinder pressure as previously described.

The re-set assembly vents the lock-up pressure after a subsequent application as previously described, resulting in the lock-up assembly being moved to the deactivated/release state, The auxiliary reservoir pressure can flow to the cylinder on subsequent brake applications as shown in FIG. 22.

In one embodiment, a method includes engaging an air brake onboard a vehicle system and subsequently releasing the air brake while retaining a designated air pressure within a brake cylinder of the air brake using a retaining valve assembly. The designated air pressure may be retained within the brake cylinder to one or more of generate a higher brake cylinder pressure on at least one subsequent brake application and/or prevent movement of the vehicle system after release of the air brake system. The designated air pressure may be retained within the brake cylinder to generate a higher brake cylinder pressure on at least one subsequent brake application (relative to the brake cylinder pressure on a subsequent brake application without the presence of the designated air pressure) and/or prevent movement of the vehicle system after release of the air brake system. The method also includes subsequently re-engaging the air brake to re-set the retaining valve assembly and exhaust the designated air pressure out of the brake cylinder, where the air brake of the vehicle system may be released to permit the movement of the vehicle system after re-setting the retaining valve assembly.

The air brake may be engaged in one or both of a determined brake pipe reduction or an emergency brake application prior to the retaining valve assembly retaining the designated air pressure in the brake cylinder. The determination may be done dynamically or in advance, so as to predetermine threshold values, responses, and the like. The air brake may be released after engaging the air brake by an operator engaging an input device to indicate release of the air brake system. Re-setting the retaining valve assembly may exhaust the designated air pressure from the brake cylinder such that an air pressure within the brake cylinder may be no greater than ambient air pressure.

The retaining valve assembly may be pneumatically re-set responsive to a designated pneumatic condition in the air brake system occurring. The retaining valve assembly may be re-set by actuating one or more motors that are coupled with the retaining valve assembly. The retaining valve assembly may be re-set responsive to an operator actuating an input device.

In one embodiment, a retainer valve assembly includes a retainer check valve that may be fluidly coupled with a brake cylinder of an air brake. The retainer check valve may retain air pressure at a designated air pressure within the brake cylinder. The retainer check valve also may vent at least part of the air pressure that may be retained in the brake cylinder. The assembly also includes a lock-up piston assembly fluidly coupled with the retainer check valve and the brake cylinder between the retainer check valve and the brake cylinder. In a release state of the air brake, the lock-up piston assembly may direct the at least part of the air pressure that may be vented from the brake cylinder to a system exhaust. Responsive to an engagement of the air brake and subsequent release of the air brake, the lock-up piston assembly may receive the at least part of the air pressure that may be vented from the brake cylinder and direct the at least part of the air pressure that may be vented from the brake cylinder to the retainer check valve to retain additional air pressure within the brake cylinder. Responsive to a subsequent re-engagement of the air brake, the lock-up piston assembly may vent the additional air pressure from the brake cylinder to the system exhaust.

A suitable lock-up piston assembly may include a lock-up spool, a diaphragm, and a resilient body. The lock-up spool may be manually actuated to an engaged position where the lock-up spool receives the air pressure from the brake cylinder. The lock-up spool may be manually actuated to a released position where the lock-up spool directs the at least part of the air pressure that may be vented from the brake cylinder to the retainer check valve.

In one embodiment, the lock-up piston assembly may include a lock-up spool, a diaphragm, and a resilient body disposed between a brake pipe of the brake system and the brake cylinder. The diaphragm may move away from the lock-up spool to permit the at least part of the air pressure that may be vented from the brake cylinder to the retainer check valve responsive to engaging the air brake. Responsive to re-charging of the air pressure in the brake pipe, the diaphragm may move toward the lock-up spool to isolate the brake cylinder from the lock-up spool and prevent the at least part of the air pressure that may be vented from the brake cylinder from flowing to the retainer check valve. The lock-up piston assembly includes a re-set spool where both the re-set spool and the retainer check valve are positioned to receive the at least part of the air pressure that may be vented from the brake cylinder. The re-set spool may isolate the additional air pressure that may be retained by the retainer check valve from the system exhaust responsive to the engagement of the air brake. Responsive to the subsequent re-engagement of the air brake, the lock-up spool may be actuated by the additional air pressure in the brake cylinder that increases, which vents the additional air pressure that may be retained by the retainer check valve to the system exhaust.

In one embodiment, a method includes fluidly coupling a retainer check valve with a brake cylinder of an air brake. The retainer check valve may retain a designated air pressure within the brake cylinder. The method also includes fluidly coupling a lock-up piston assembly with the retainer check valve and the brake cylinder between the retainer check valve and the brake cylinder. In a release state of the air brake, the lock-up piston assembly may direct air pressure that may be vented from the brake cylinder to a system exhaust. Responsive to an engagement of the air brake and subsequent release of the air brake, the lock-up piston assembly may receive the air pressure that may be vented from the brake cylinder and direct the air pressure vented from the brake cylinder to the retainer check valve to retain the designated air pressure within the brake cylinder. Responsive to a subsequent re-engagement of the air brake, the lock-up piston assembly may vent the designated air pressure to the system exhaust.

Fluidly coupling the lock-up piston assembly may include fluidly coupling a lock-up spool, a diaphragm, and a resilient body disposed between a brake pipe of the brake system and the brake cylinder such that the diaphragm moves away from the lock-up spool to permit the air pressure vented from the brake cylinder to the retainer check valve responsive to engaging the air brake. The lock-up piston assembly may be fluidly coupled with the brake pipe and the brake cylinder such that, responsive to re-charging of the air pressure in the brake pipe, the diaphragm may move toward the lock-up spool to isolate the brake cylinder from the lock-up spool and prevent the air pressure from the brake cylinder from flowing to the retainer check valve. The lock-up piston assembly may include a re-set spool fluidly coupled with the brake pipe and the brake cylinder such that, responsive to the engagement of the air brake, the re-set spool and the retainer check valve receive the air pressure from the brake cylinder.

The lock-up piston assembly may be fluidly coupled with the brake pipe and the brake cylinder such that the re-set spool isolates the air pressure that may be retained by the retainer check valve from the system exhaust responsive to the engagement of the air brake. The lock-up piston assembly may be fluidly coupled with the brake pipe and the brake cylinder such that, responsive to the subsequent re-engagement of the air brake, the lock-up spool may be actuated by the air pressure in the brake cylinder that increases, which vents the air pressure that may be retained by the retainer check valve to the system exhaust.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
engaging a brake onboard a vehicle system;
subsequently releasing the brake while retaining a designated pressure within a brake cylinder of the brake using a retaining valve assembly, the designated pressure retained within the brake cylinder to one or more of generate a higher brake cylinder pressure on at least one subsequent brake application or prevent movement of the vehicle system after release of the brake system; and
subsequently re-engaging the brake and, responsive to subsequently re-engaging the brake, re-setting the retaining valve assembly and exhausting the designated pressure out of the brake cylinder, and wherein the brake of the vehicle system is released to permit the movement of the vehicle system after the re-setting the retaining valve assembly.

2. The method of claim 1, wherein the brake is engaged in one or more of a determined brake pipe reduction or an emergency brake application prior to the retaining valve assembly retaining the designated pressure in the brake cylinder.

3. The method of claim 1, wherein the brake is released after engaging the brake by an operator engaging an input device to indicate release of the brake system.

4. The method of claim 1, wherein the brake is an air brake and the designated pressure is a designated air pressure, and re-setting the retaining valve assembly exhausts the designated air pressure from the brake cylinder such that an air pressure within the brake cylinder is no greater than ambient air pressure.

5. The method of claim 1, wherein the retaining valve assembly is pneumatically re-set responsive to a designated pneumatic condition in the brake system occurring.

6. The method of claim 1, wherein the retaining valve assembly is re-set by actuating one or more motors that are coupled with the retaining valve assembly.

7. The method of claim 1, wherein the retaining valve assembly is re-set responsive to an operator actuating an input device.

8. A retainer valve assembly comprising:
a retainer check valve configured to be fluidly coupled with a brake cylinder of an air brake, the retainer check valve configured to retain air pressure at a designated air pressure within the brake cylinder, the retainer check valve also configured to vent at least part of the air pressure that is retained in the brake cylinder; and
a lock-up piston assembly fluidly coupled with the retainer check valve and the brake cylinder between the retainer check valve and the brake cylinder, and
in a release state of the air brake, the lock-up piston assembly is configured to direct the at least part of the air pressure that is vented from the brake cylinder to a system exhaust, and
responsive to an engagement of the air brake and subsequent release of the air brake, the lock-up piston assembly is configured to receive the at least part of the air pressure that is vented from the brake cylinder and direct the at least part of the air pressure that is vented from the brake cylinder to the retainer check valve to retain additional air pressure within the brake cylinder, and
responsive to a subsequent re-engagement of the air brake, the lock-up piston assembly is configured to vent the additional air pressure from the brake cylinder to the system exhaust.

9. The retainer valve assembly of claim 8, wherein the lock-up piston assembly includes a lock-up spool, a diaphragm, and a resilient body, the lock-up spool configured to be manually actuated to an engaged position where the lock-up spool receives the air pressure from the brake cylinder, the lock-up spool configured to be manually actuated to a released position where the lock-up spool directs the at least part of the air pressure that is vented from the brake cylinder to the retainer check valve.

10. The retainer valve assembly of claim 8, wherein the lock-up piston assembly includes a lock-up spool, a diaphragm, and a resilient body disposed between a brake pipe of the brake system and the brake cylinder, the diaphragm configured to move away from the lock-up spool to permit the at least part of the air pressure that is vented from the brake cylinder to the retainer check valve responsive to engaging the air brake.

11. The retainer valve assembly of claim 10, wherein, responsive to re-charging of the air pressure in the brake pipe, the diaphragm is configured to move toward the lock-up spool to isolate the brake cylinder from the lock-up spool and prevent the at least part of the air pressure that is vented from the brake cylinder from flowing to the retainer check valve.

12. The retainer valve assembly of claim 10, wherein the lock-up piston assembly includes a re-set spool where both the re-set spool and the retainer check valve positioned to receive the at least part of the air pressure that is vented from the brake cylinder.

13. The retainer valve assembly of claim 12, wherein the re-set spool is configured to isolate the additional air pressure that is retained by the retainer check valve from the system exhaust responsive to the engagement of the air brake.

14. The retainer valve assembly of claim 12, wherein, responsive to the subsequent re-engagement of the air brake, the lock-up spool is configured to be actuated by the additional air pressure in the brake cylinder that increases, which vents the additional air pressure that is retained by the retainer check valve to the system exhaust.

15. A method comprising:
switching from a designated pressure retaining state a within a brake cylinder to a release state of brake cylinder during which the designated pressure is vented from the brake cylinder, wherein the designated pressure is a designated air pressure;
directing the designated air pressure that is vented from the brake cylinder to a system exhaust;
responding to switching from the release state back to the retaining state by receiving the designated air pressure that is vented from the brake cylinder and directing the designated air pressure that was vented from the brake cylinder to a retainer check valve to retain the designated air pressure within the brake cylinder; and
fluidly coupling a lock-up piston assembly, which includes fluidly coupling a lock-up spool, a diaphragm, and a resilient body disposed between a brake pipe of the brake system and the brake cylinder such that the diaphragm moves away from the lock-up spool to permit the air pressure vented from the brake cylinder to the retainer check valve responsive to engaging the air brake.

16. The method of claim 15, wherein the lock-up piston assembly is fluidly coupled with the brake pipe and the brake cylinder such that, responsive to re- charging of the air pressure in the brake pipe, the diaphragm moves toward the lock-up spool to isolate the brake cylinder from the lock-up spool and prevent the air pressure from the brake cylinder from flowing to the retainer check valve.

17. The method of claim 15, wherein the lock-up piston assembly includes a re-set spool fluidly coupled with the brake pipe and the brake cylinder, and the method further includes responding to the engagement of the air brake by receive the air pressure from the brake cylinder.

18. The method of claim 17, further comprising isolating the air pressure that is retained by the retainer check valve from the system exhaust via the re-set spool responsive to the engagement of the air brake.

19. The method of claim 17, further comprising responding to a subsequent re-engagement of the air brake by actuating the lock-up spool increasing the air pressure in the brake cylinder, and thereby to vent the air pressure that is retained by the retainer check valve to the system exhaust.

* * * * *